(12) United States Patent
Yin et al.

(10) Patent No.: US 12,134,852 B2
(45) Date of Patent: Nov. 5, 2024

(54) LIQUID FEEDING PUMP, DISPENSING SYSTEM AND WASHING DEVICE

(71) Applicant: JIANGSU LEILI MOTOR CO., LTD., Changzhou (CN)

(72) Inventors: Liwei Yin, Changzhou (CN); Xiaoqiang Wang, Changzhou (CN)

(73) Assignee: JIANGSU LEILI MOTOR CO., LTD., Changzhou (CN)

( * ) Notice: Subject to any disclaimer, the term of this patent is extended or adjusted under 35 U.S.C. 154(b) by 236 days.

(21) Appl. No.: 17/583,468

(22) Filed: Jan. 25, 2022

(65) Prior Publication Data

US 2022/0236093 A1 Jul. 28, 2022

(30) Foreign Application Priority Data

Jan. 28, 2021 (CN) .......................... 202110118716.1
Oct. 29, 2021 (CN) .......................... 202122638446.5

(51) Int. Cl.
*D06F 39/08* (2006.01)
*A47L 15/42* (2006.01)
(Continued)

(52) U.S. Cl.
CPC ........ *D06F 39/088* (2013.01); *A47L 15/4214* (2013.01); *A47L 15/4418* (2013.01);
(Continued)

(58) Field of Classification Search
CPC .. F04B 43/1136; F04B 43/10; F04B 45/0336; F04B 45/02; F04B 45/022; F04B 43/086; F04B 43/08; F04B 45/053; F04B 43/0054; F04B 43/06; A47L 15/4418; A47L 15/4214; D06F 39/02; D06F 39/088; D06F 2103/14; G01F 11/08
See application file for complete search history.

(56) References Cited

U.S. PATENT DOCUMENTS

| | | | | |
|---|---|---|---|---|
| 2,960,038 A | * | 11/1960 | Lupfer | F04B 43/113 91/39 |
| 5,329,948 A | * | 7/1994 | Nogi | A47L 15/4418 134/28 |
| 6,461,695 B1 | * | 10/2002 | Schaap | B29C 70/222 428/34.1 |

FOREIGN PATENT DOCUMENTS

| | | |
|---|---|---|
| CN | 105088685 | 11/2015 |
| CN | 105297350 | 2/2016 |

(Continued)

*Primary Examiner* — Peter J Bertheaud
(74) *Attorney, Agent, or Firm* — Barnes & Thornburg LLP

(57) ABSTRACT

A liquid feeding pump is disclosed, including: a pump housing defining a hydraulic chamber, and a water inlet portion and a water outlet portion allowing a first liquid to enter or to be discharged from the hydraulic chamber; a pump chamber member defining a pump chamber isolated from the hydraulic chamber, the pump chamber member being movable between a first configuration in which the pump chamber has a first volume and a second configuration in which the pump chamber has a second volume; a liquid inlet portion and a liquid outlet portion allowing a second liquid to enter or to be discharged from the pump chamber; wherein, the liquid feeding pump is configured such that the first liquid entering the hydraulic chamber via the water inlet portion can urge the pump chamber member towards its second configuration, thereby pumping the second liquid out of the pump chamber.

17 Claims, 28 Drawing Sheets

(51) Int. Cl.
*A47L 15/44* (2006.01)
*D06F 39/02* (2006.01)
*D06F 103/14* (2020.01)
*F04B 43/00* (2006.01)
*F04B 43/06* (2006.01)
*F04B 43/08* (2006.01)
*F04B 43/10* (2006.01)
*F04B 43/113* (2006.01)
*F04B 45/02* (2006.01)
*F04B 45/033* (2006.01)
*F04B 45/053* (2006.01)
*G01F 11/08* (2006.01)

(52) U.S. Cl.
CPC .......... *D06F 39/02* (2013.01); *F04B 43/0054* (2013.01); *F04B 43/06* (2013.01); *F04B 43/08* (2013.01); *F04B 43/086* (2013.01); *F04B 43/10* (2013.01); *F04B 43/1136* (2013.01); *F04B 45/02* (2013.01); *F04B 45/022* (2013.01); *F04B 45/0336* (2013.01); *F04B 45/053* (2013.01); *D06F 2103/14* (2020.02); *G01F 11/08* (2013.01)

(56) References Cited

FOREIGN PATENT DOCUMENTS

| | | |
|---|---|---|
| CN | 106048985 | 10/2016 |
| CN | 111455632 | 7/2020 |
| CN | 211340102 U | 8/2020 |
| CN | 212294107 U | 1/2021 |
| CN | 211213028 U | 11/2021 |
| CN | 215714060 U | 2/2022 |

* cited by examiner

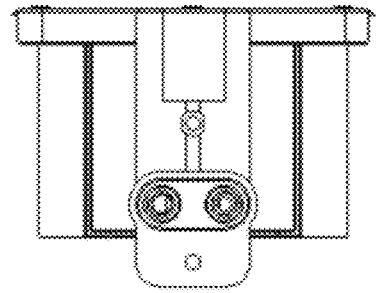
Fig. 8
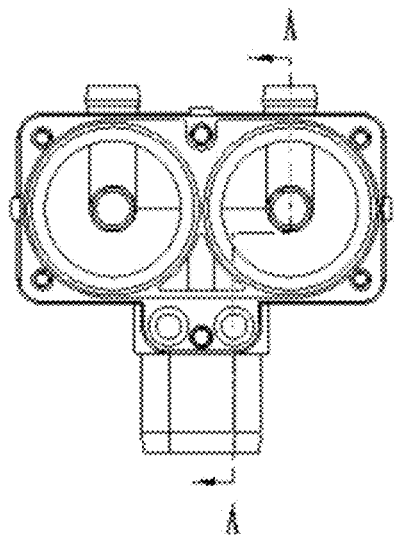
Fig. 9
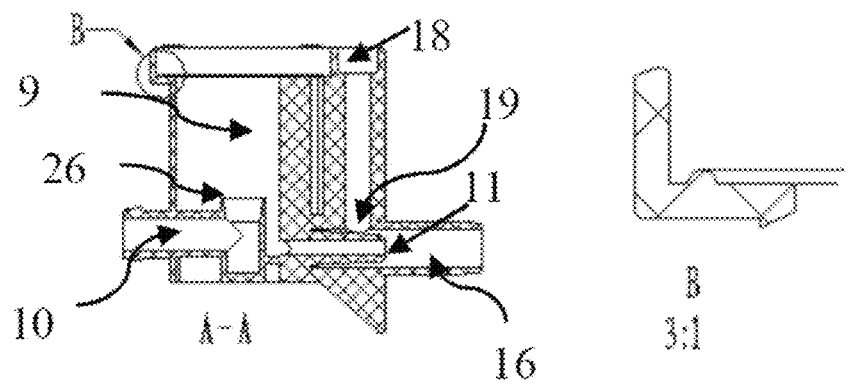
Fig. 10
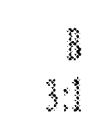
Fig. 11
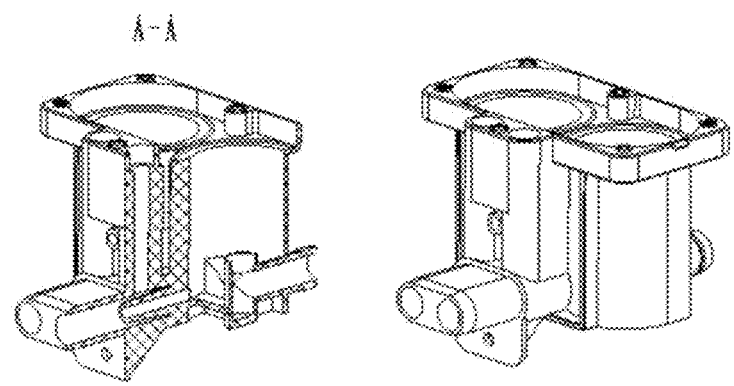
Fig. 12
Fig. 13

B-B

A-A

LIQUID FEEDING PUMP, DISPENSING SYSTEM AND WASHING DEVICE

CROSS-REFERENCE TO RELATED APPLICATIONS

This application claims priority from Chinese Application Number CN 202110118716.1, filed on Jan. 28, 2021 and from Chinese Application Number CN 202122638446.5, filed on Oct. 29, 2021, the entirety of each is hereby fully incorporated by reference herein.

TECHNICAL FIELD

The present disclosure relates to a liquid feeding pump, a dispensing system comprising the liquid feeding pump and a washing device comprising the dispensing system.

BACKGROUND

Conventionally, an automatic quantitative liquid feeding system of a laundry machine or dishwasher mainly uses two dispensing methods, a first one of which adopts a displacement pump driven by a motor to carry out automatic quantitative liquid feeding, while a second one adopts a venturi tube combined with a flowmeter to carry out quantitative liquid feeding.

The method adopting the displacement pump driven by a motor has the following disadvantages. First of all, in this method, the motor drives the pump chamber volume to change regularly, generating alternating positive and negative pressure, and thus realizing a liquid pumping. Therefore, a motor has to be used, resulting in a high cost per single product. Secondly, the motor needs to be equipped with a special interface and control circuit, resulting in a high supporting cost and a large investment when upgrading old machines. In addition, the motor has a large number of parts, resulting a whole system with many potential failure points.

There are also some disadvantages in the method adopting the venturi tube. Hydraulic drive is necessary for the venturi tube and a separate water inlet valve must be equipped for water supply. During the water supply, the venturi tube is always operating, that is, the water solution is always being dispensed. The water inlet valve is provided only for generating hydraulic pressure of the venturi tube without any other use. Another water inlet valve needs to be provided for water inlet of the laundry machine, which results in a relatively large number of water inlet valves in the whole system and thus a high cost. In addition, the venturi tube alone can only realize the function of conveying solution, but can't realize the quantitative function, so it needs to cooperate with a flowmeter for quantitative dispensing, which involves the cost of the flowmeter and thus increases supporting control cost. Moreover, the methods adopting the venturi tube involves the water inlet valve and the flowmeter, and thus the number of parts in the whole system is large, which also increases potential failure points.

Therefore, there is a need for an improved liquid feeding pump that can at least partially overcome the disadvantages of the prior art.

SUMMARY OF THE INVENTION

The present disclosure is intended to provide an improved liquid feeding pump which can overcome at least some of the above technical problems in the prior art.

According to one aspect of the present disclosure, there is provided a liquid feeding pump, comprising:
  a pump housing defining a hydraulic chamber, and a water inlet portion and a water outlet portion communicating with the hydraulic chamber, wherein the water inlet portion is configured to allow a first liquid to enter the hydraulic chamber, while the water outlet portion is configured to allow the first liquid to be discharged from the hydraulic chamber;
  a pump chamber member at least partially arranged in the hydraulic chamber, and defining a pump chamber isolated from the hydraulic chamber, the pump chamber member being movable between a first configuration in which the pump chamber has a first volume and a second configuration in which the pump chamber has a second volume, the first volume being larger than the second volume;
  a liquid inlet portion and a liquid outlet portion which are communicated with the pump chamber, wherein the liquid inlet portion is configured to allow a second liquid to enter the pump chamber, while the liquid outlet portion is configured to allow the second liquid to be discharged from the pump chamber;
  wherein the liquid feeding pump is configured such that the first liquid entering the hydraulic chamber through the water inlet portion can urge the pump chamber member towards its second configuration, thereby pumping the second liquid from the pump chamber through the liquid outlet portion.

According to another aspect of the present disclosure, there is provided a dispensing system, comprising a liquid feeding pump and a liquid storage box communicated with the liquid inlet portion of the liquid feeding pump.

According to another aspect of the present disclosure, there is provided a washing device including a delivery system.

BRIEF DESCRIPTION

FIGS. 8-13 show a pump housing for the liquid feeding pump proposed in the present disclosure from different perspectives and views, wherein FIG. 10 is a sectional view taken along line A-A of FIG. 9, and FIG. 11 is an enlarged view of area B of FIG. 10;

Figure 18:
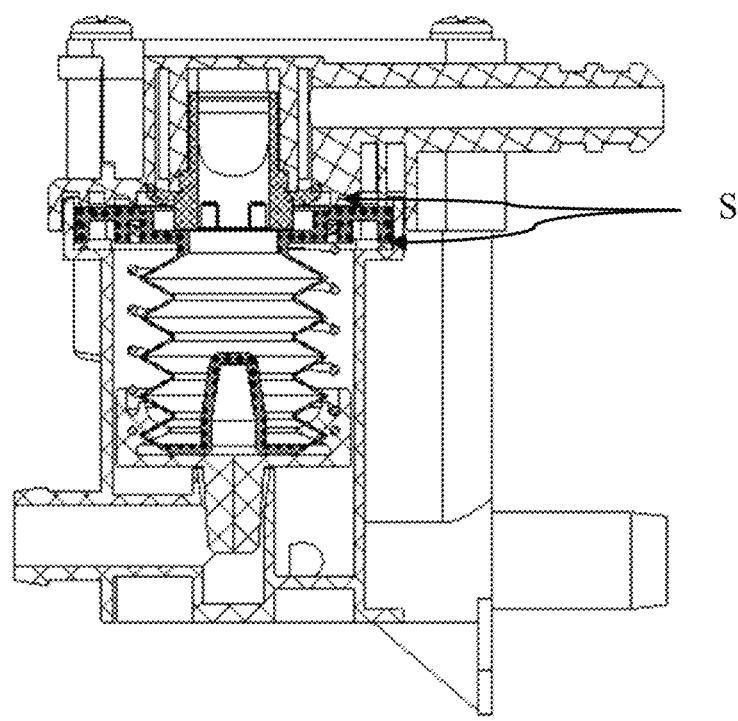
Figure 19:
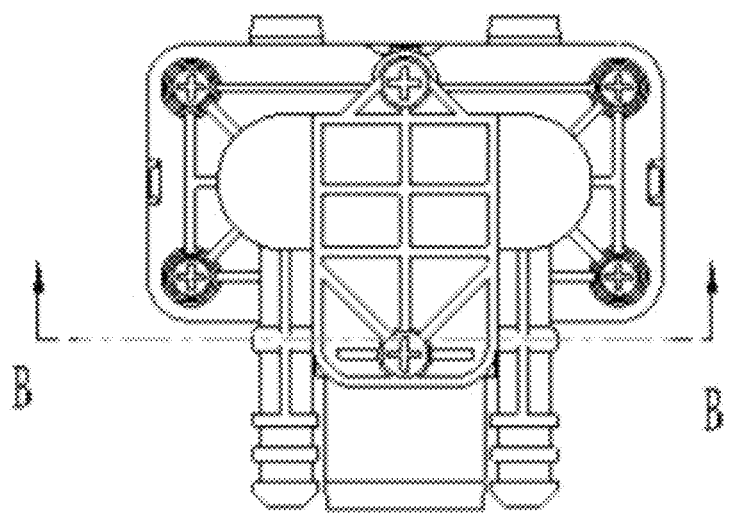
Figure 20:
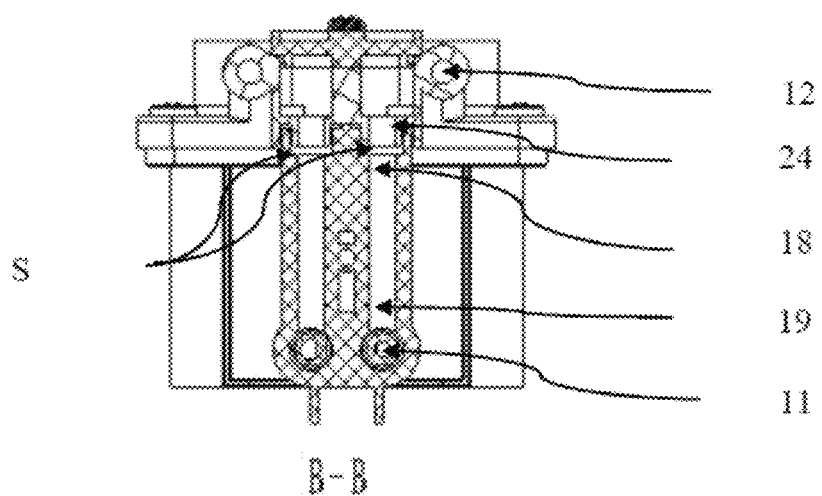
Figure 21:
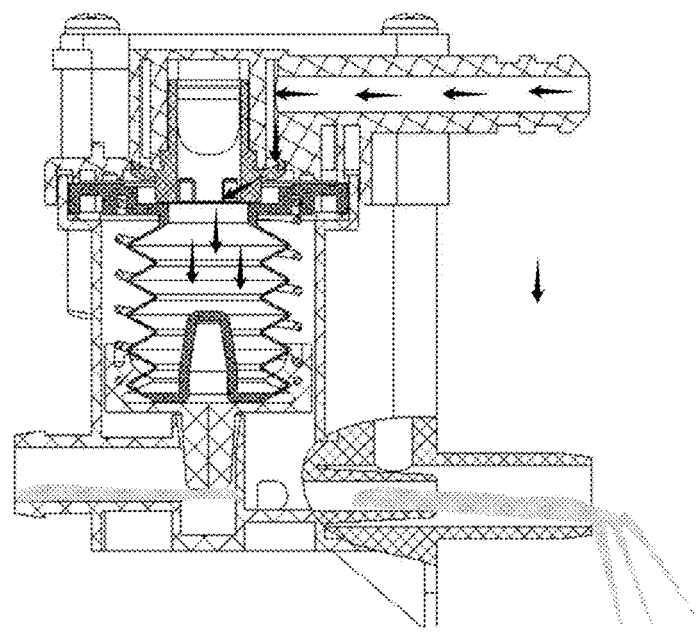
Figure 26:
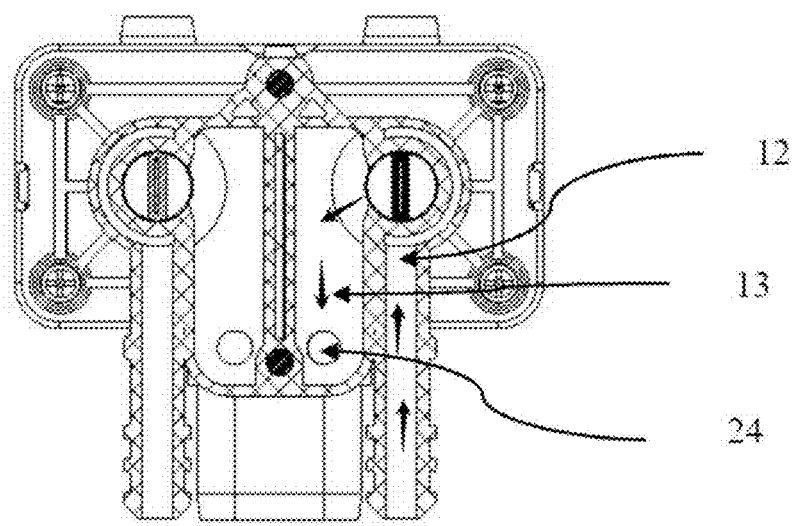
Figure 27:
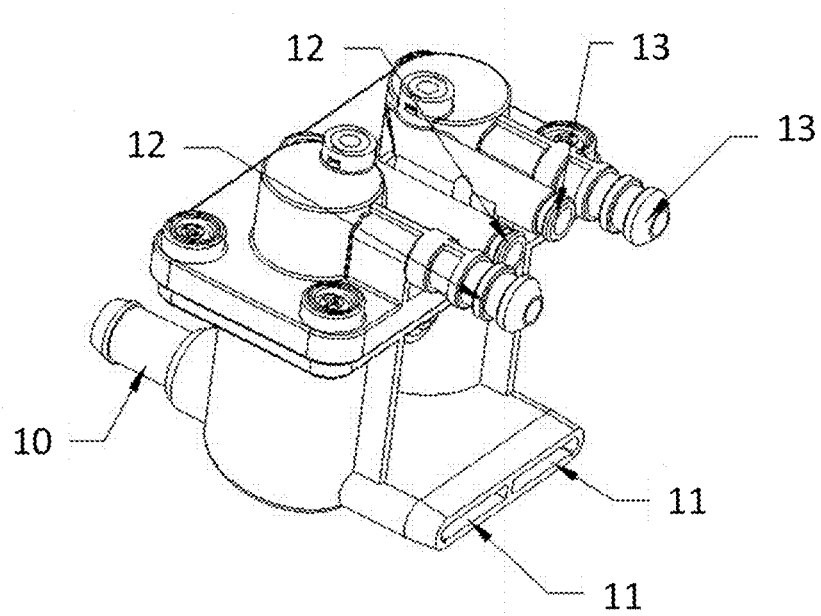
Figure 28:
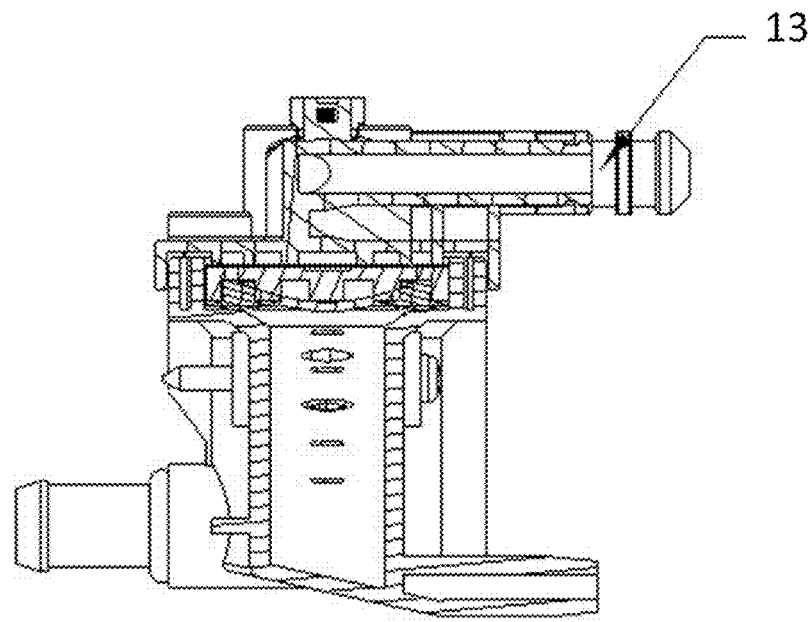
Figure 29:
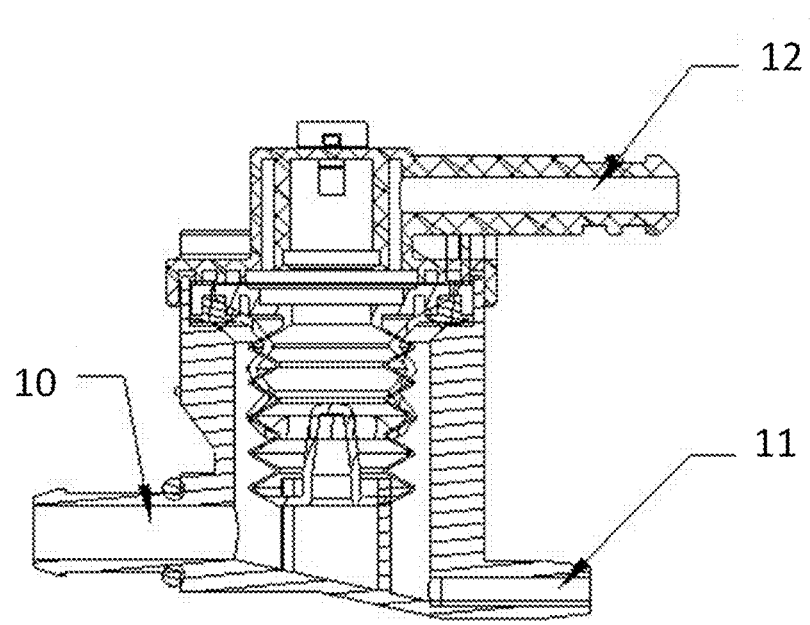
Figure 30A:
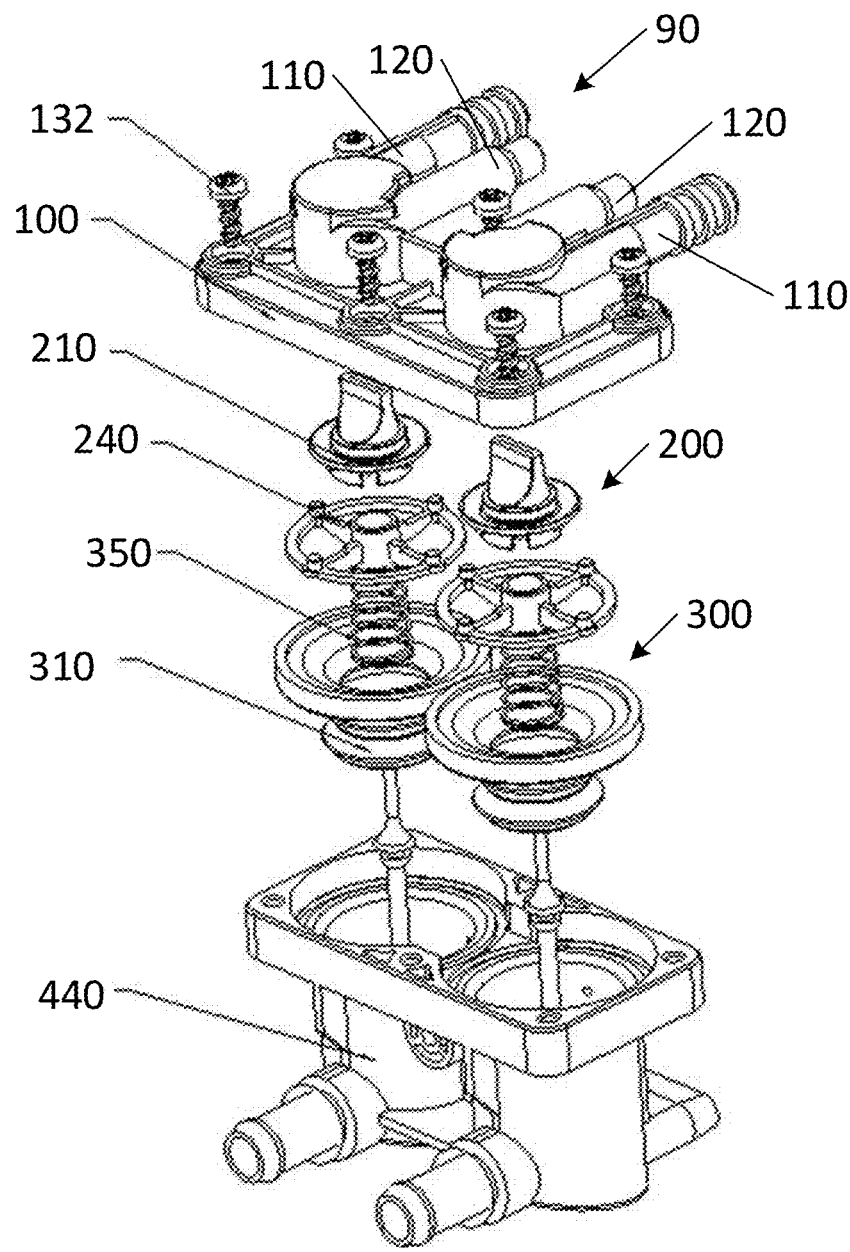
Figure 30B:
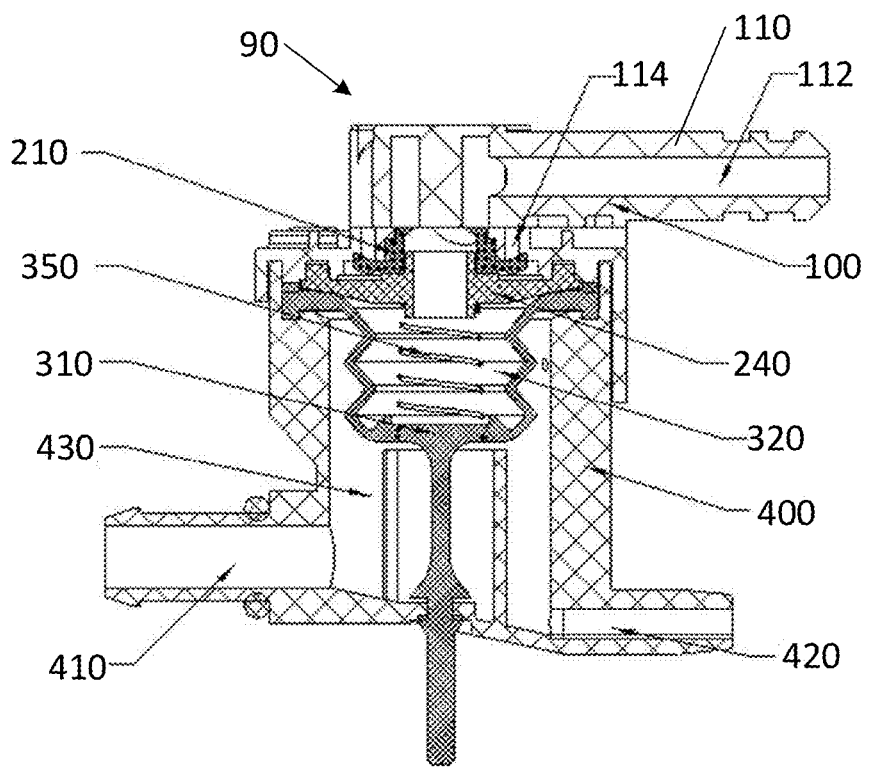
Figure 30C:
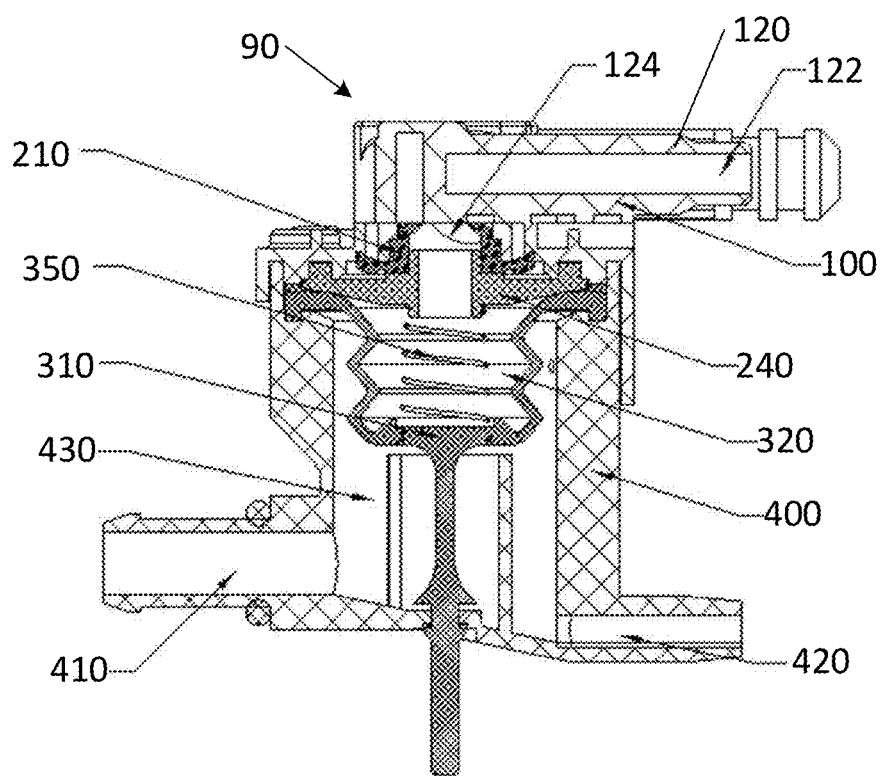
Figure 31A:
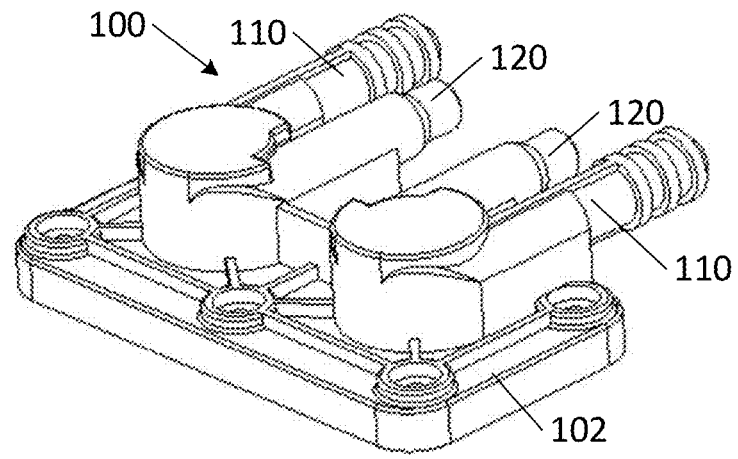
Figure 31B:
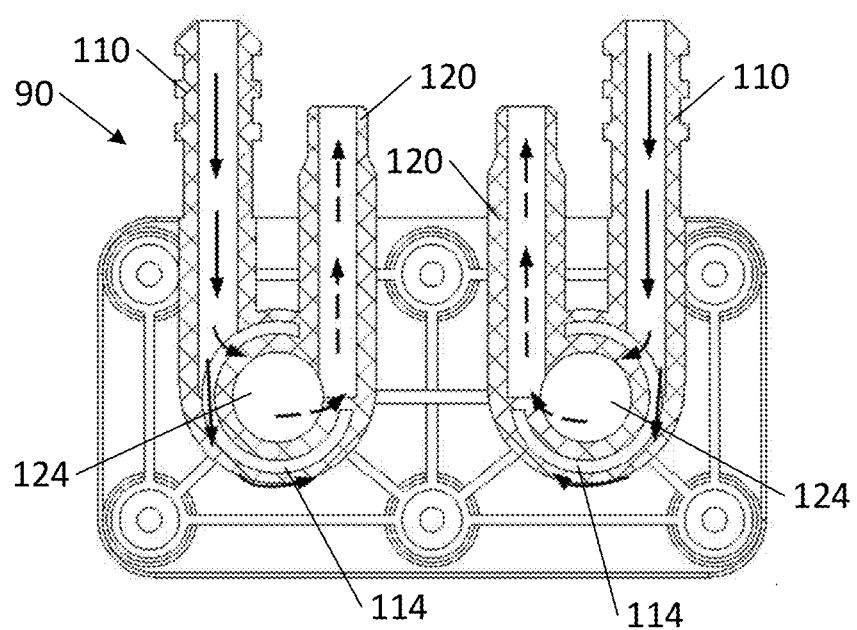
Figure 31C:
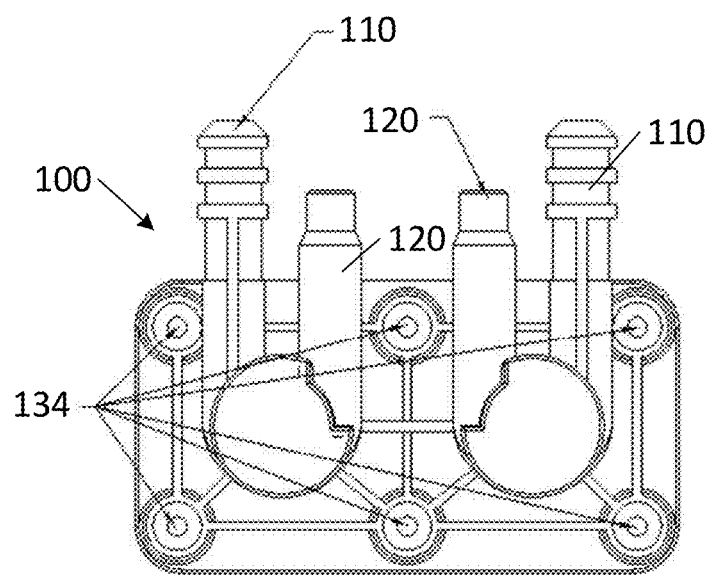
Figure 31D:
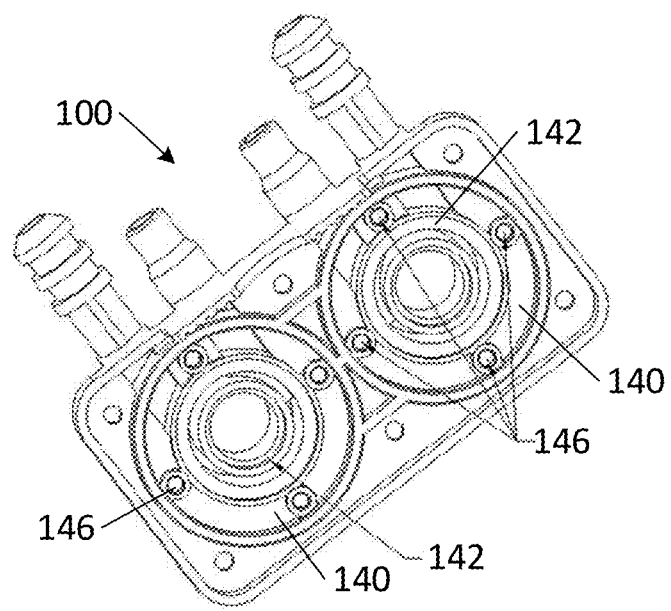
Figure 32A:
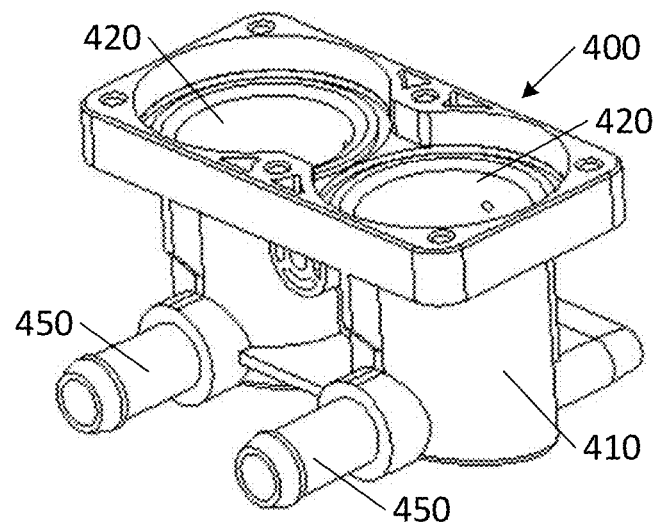
Figure 32B:
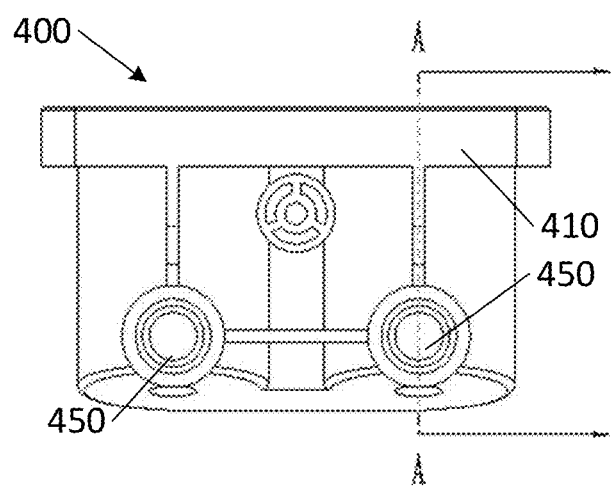
Figure 32C:
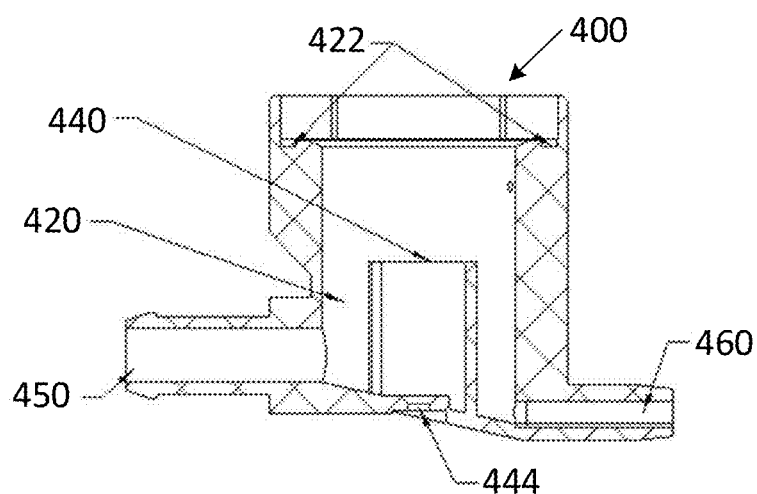
Figure 32D:
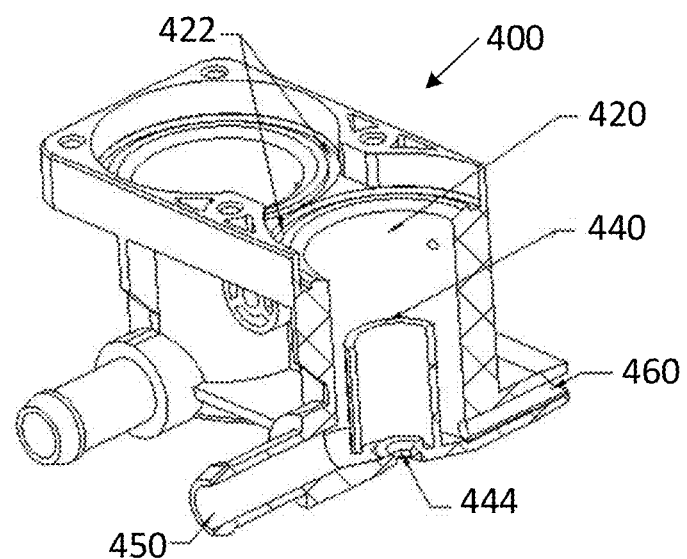
Figure 33A:
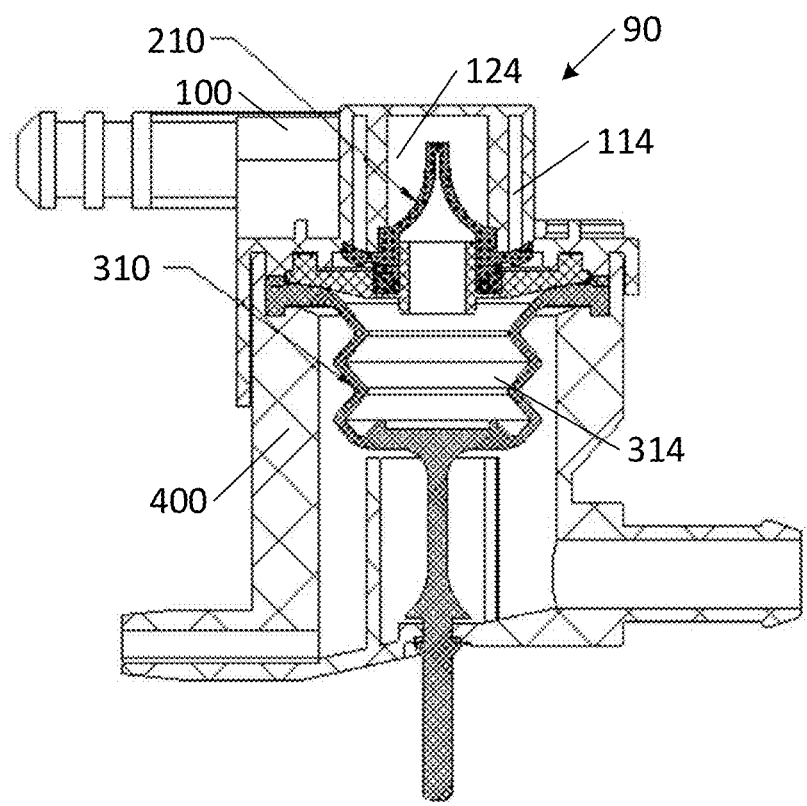
Figure 33B:
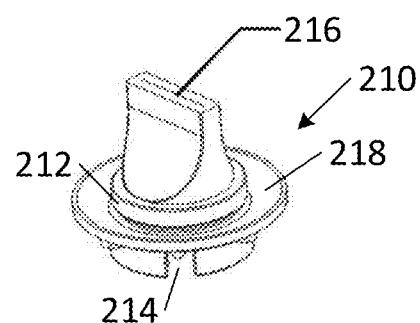
Figure 33C:
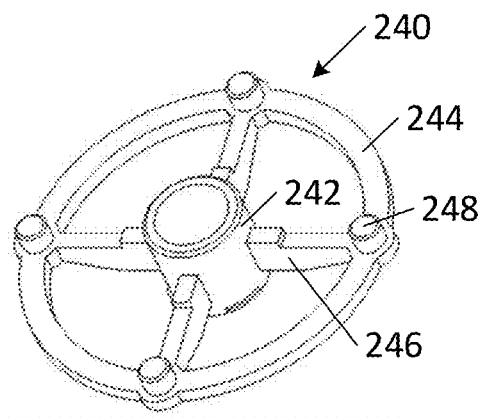
Figure 34A:
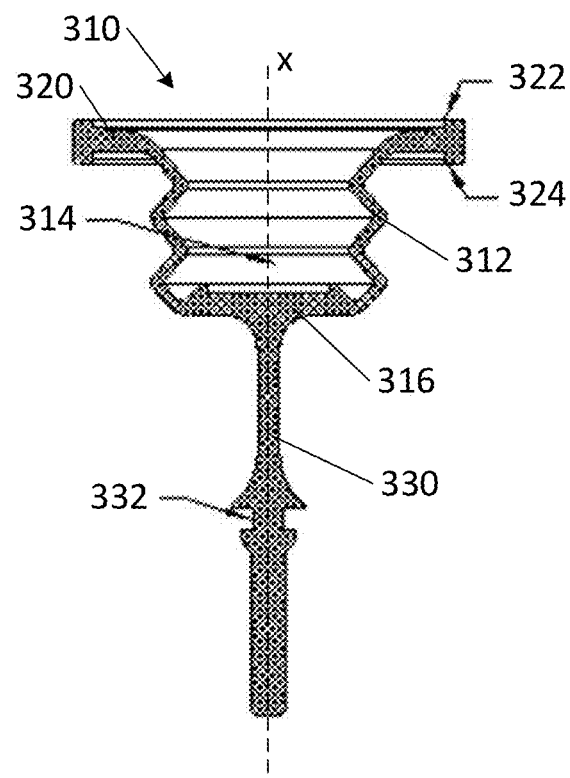
Figure 34B:
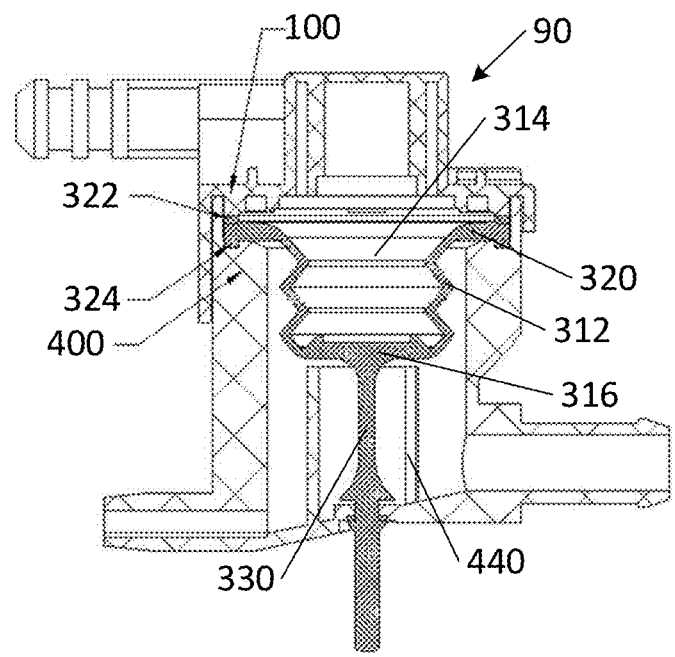
Figure 34C:
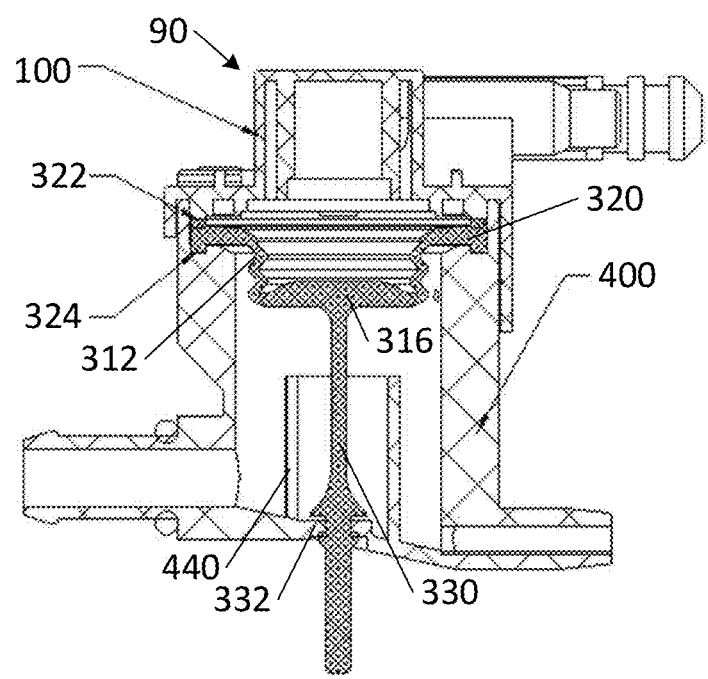
Figure 35A:
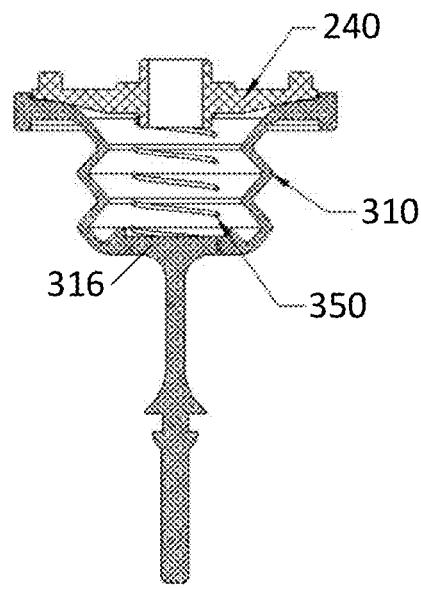
Figure 35B:
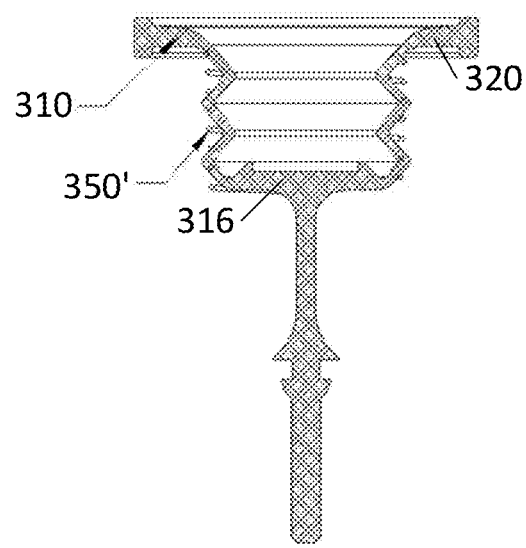
Figure 35C:
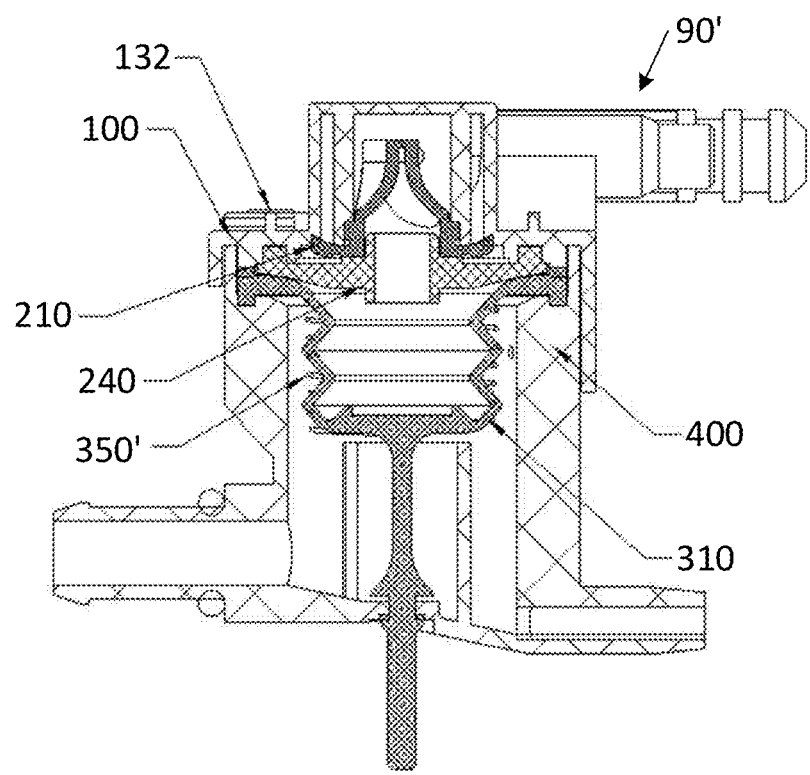
Figure 36A:
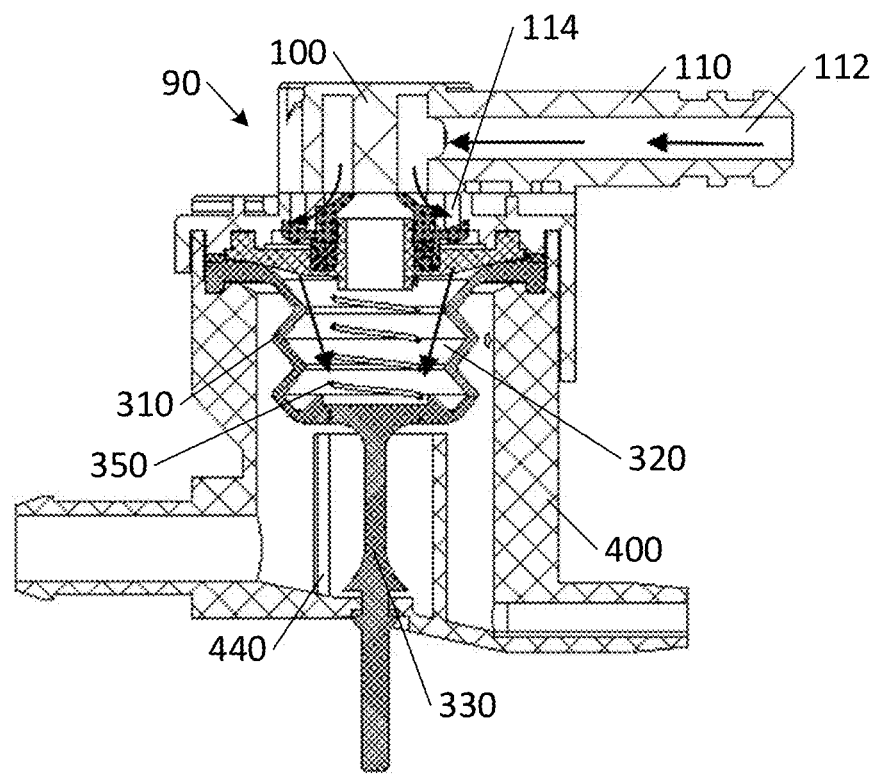
Figure 36B:
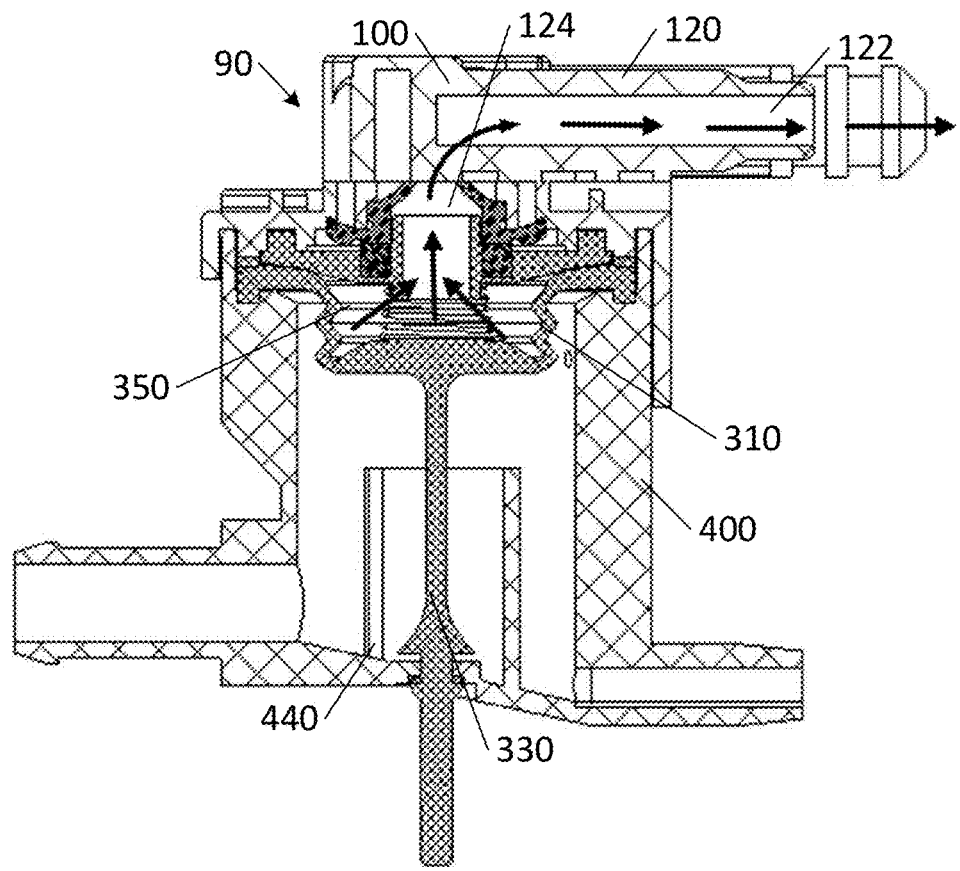
Figure 37A:
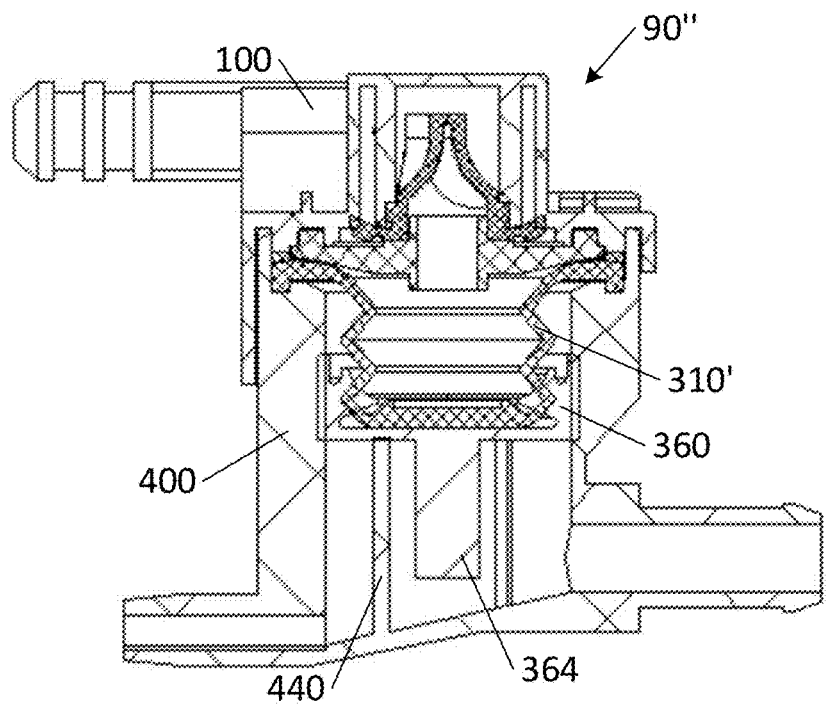
Figure 37B:
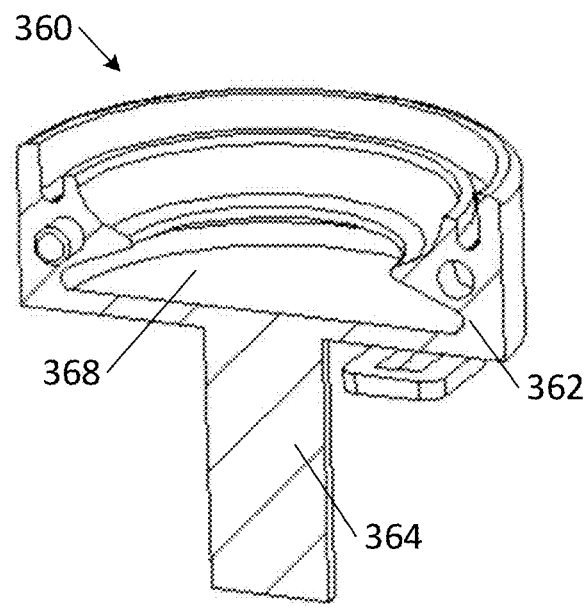
Figure 38A:
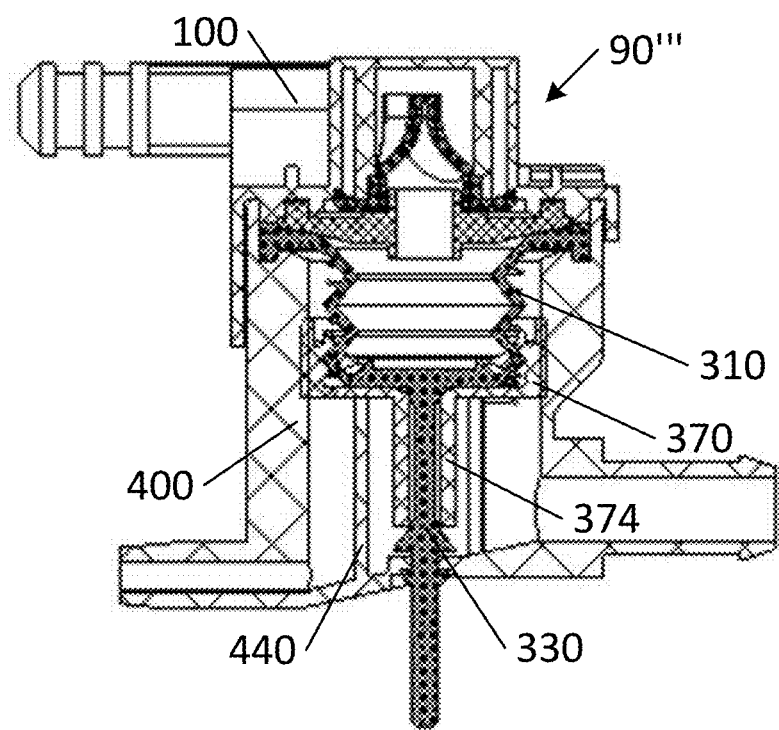
Figure 38B:
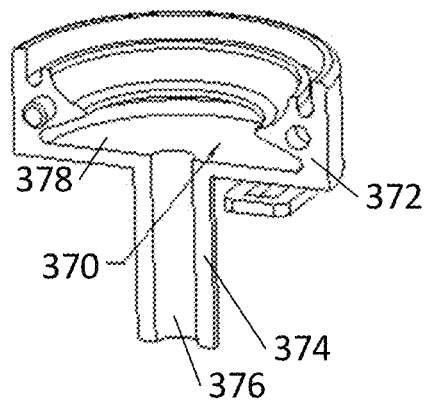
Figure 39:
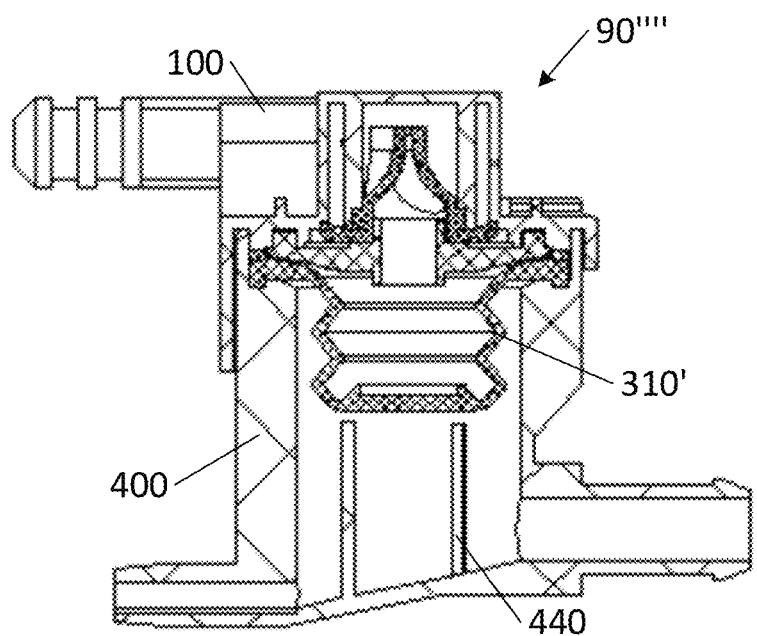

FIGS. 18-20 respectively show the liquid feeding pump proposed in this disclosure from different perspectives and views, and especially show the installation position of a seal;

FIG. 21 shows the liquid feeding pump proposed in this disclosure in a position when being fed with liquid;

FIGS. 22-25 respectively show from different perspectives and views the liquid feeding pump proposed in this disclosure in a position when discharging;

FIG. 26 shows the flow direction of the liquid in the pump head when being fed with liquid and discharging liquid;

FIGS. 27-29 show another embodiment of the liquid feeding pump from different perspectives and views;

FIGS. 30A-30C illustrate a liquid feeding pump according to some embodiments of the present disclosure, wherein FIG. 30A is an exploded view of the liquid feeding pump, and FIGS. 30B and 30C are sectional views of the liquid feeding pump;

FIGS. 31A-31D show a pump head of the liquid feeding pump according to some embodiments of the present disclosure, wherein FIG. 31A is a perspective view of the pump head, FIG. 31B is a sectional view of the pump head, FIG. 31C is a top view of the pump head, and FIG. 31D is a bottom view of the pump head;

FIGS. 32A-32D show a pump housing of the liquid feeding pump according to some embodiments of the present disclosure, wherein FIG. 32A is a perspective view of the pump housing, FIG. 32B is a front view of the pump housing, FIG. 32C is a sectional view taken along the line A-A of FIG. 32B, and FIG. 32D is a perspective sectional view taken along the line A-A of FIG. 32B;

FIGS. 33A-33C show a one-way valve and its mounting bracket according to some embodiments of the present disclosure, wherein FIG. 33A is a sectional view showing the one-way valve and its mounting bracket installed in the liquid feeding pump, and FIGS. 33B and 33C respectively show perspective views of the one-way valve and the mounting bracket;

FIGS. 34A-34C show a pump chamber member according to some embodiments of the present disclosure, wherein FIG. 34A is a cross-sectional view of the pump chamber member, and FIGS. 34B and 34C are cross-sectional views of the liquid feeding pump, respectively showing a rest configuration and a compressed configuration of the pump chamber member;

FIGS. 35A-35C show a returning spring of a pump chamber member according to some embodiments of the present disclosure, wherein the returning spring of FIG. 35A is located radially inside a cylindrical body of the pump chamber member, the returning spring of FIG. 35B is located radially outside the cylindrical body of the pump chamber member, and FIG. 35C shows the installation position of the returning spring in the liquid feeding pump;

FIGS. 36A-36B show cross-sectional views of a liquid feeding pump according to some embodiments of the present disclosure, wherein FIG. 36A shows a sucking process and FIG. 36B shows a pumping process;

FIGS. 37A-37B show a liquid feeding pump according to some embodiments of the present disclosure, which includes a returning spring mounting seat, wherein FIG. 37A shows a liquid feeding pump and FIG. 37B shows a returning spring mounting seat;

FIGS. 38A-38B show a liquid feeding pump according to some other embodiments of the present disclosure, which include a returning spring mounting seat, wherein FIG. 38A shows the liquid feeding pump and FIG. 38B shows the returning spring mounting seat;

FIG. 39 shows a cross-sectional view of a liquid feeding pump according to some other embodiments of the present disclosure.

DETAILED DESCRIPTION OF DISCLOSURE

Embodiments of the present disclosure will be described in detail below, examples of which are shown in the drawings where a same or similar reference numerals indicate the same or similar elements or elements with the same or similar functions. The embodiments described below with reference to the drawings are exemplary, only for explaining the present disclosure, and are not to be construed as limitations of the present disclosure.

Unless otherwise defined, the technical terms or scientific terms used herein should have the ordinary meaning understood by those with ordinary skills in the field to which this disclosure belongs. In the description of this disclosure, it should be understood that orientations and positional relationships that the terms 'center', 'longitudinal', 'lateral', 'upper', 'lower', 'front', 'rear', 'left', 'right', 'vertical', 'horizontal', 'top', 'bottom', 'inner' and 'outer' etc. are based on the orientations and positional relationships shown in the drawings and only for convenience of describing the present disclosure and simplifying the description, rather than indicating or implying that the device or element referred to must have a specific orientation, or be configured and operated in a specific orientation, and therefore cannot be understood as a limitation to the present disclosure. In addition, the terms 'first' and 'second' are used for descriptive purposes only, and cannot be understood as indicating or implying relative importance.

Figure 1:
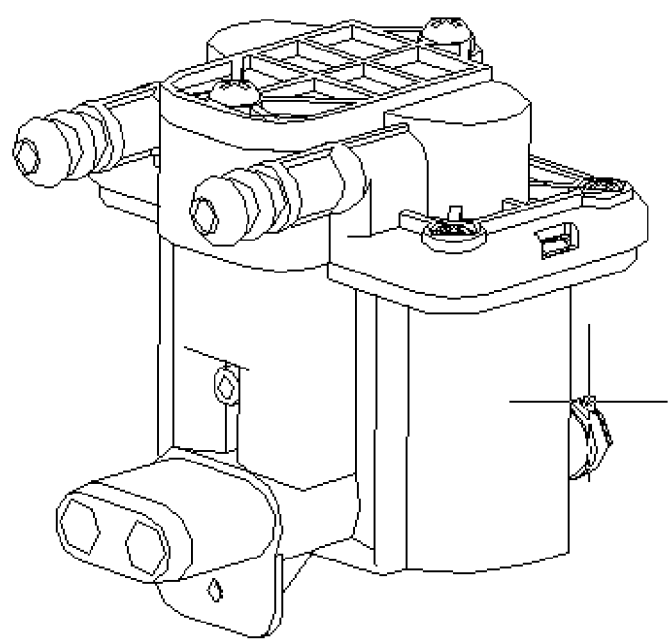
FIG. 1 shows an exterior view of some exemplary embodiments of the liquid feeding pump proposed in the present disclosure.
Figure 2:
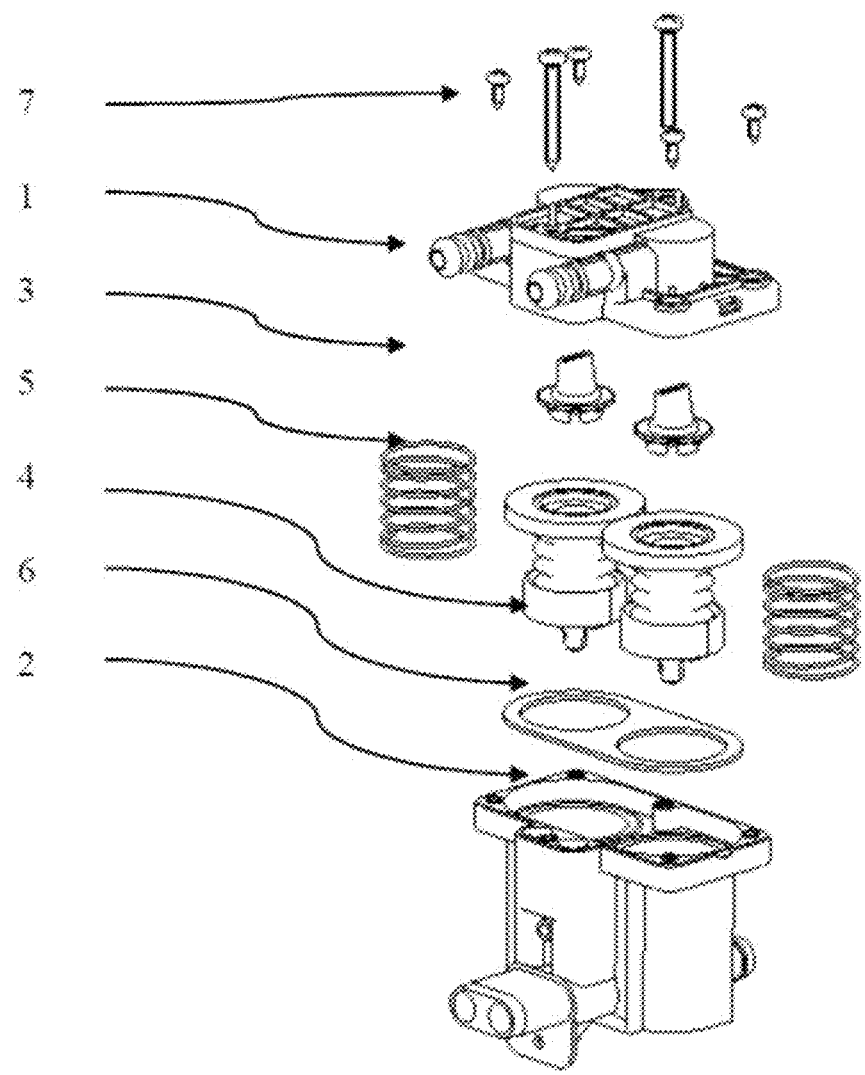
FIG. 2 shows an exploded view of some exemplary embodiments of the liquid feeding pump proposed in the present disclosure.
Figure 3:
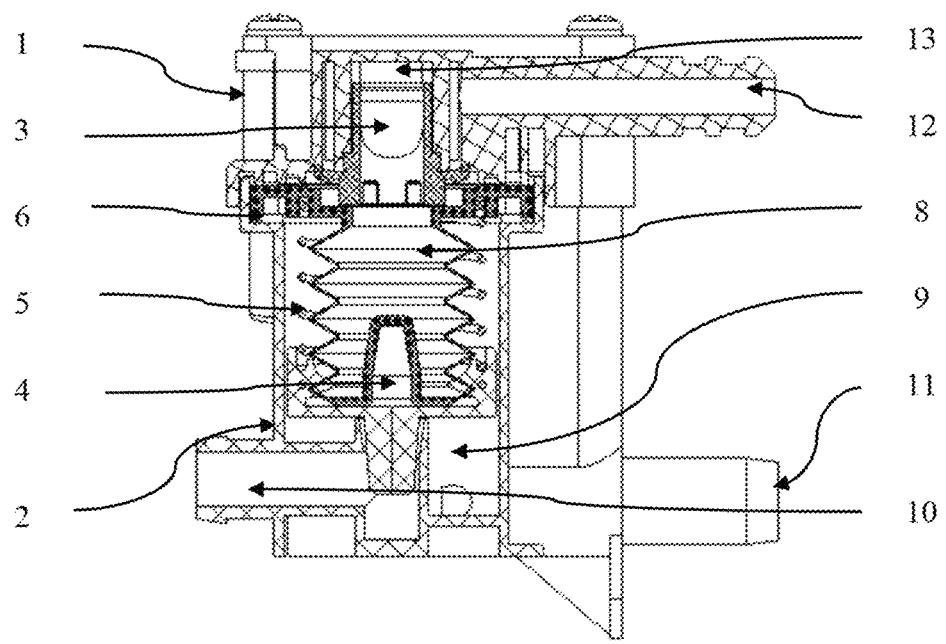
FIG. 3 shows a cross-sectional view of some exemplary embodiments of the liquid feeding pump proposed in the present disclosure.

FIGS. 1-3 show an overall configuration of the liquid feeding pump proposed in this disclosure, in which FIG. 1 shows the exterior view of an exemplary liquid feeding pump, FIG. 2 shows its exploded view, and FIG. 3 shows a sectional view of its assemble.

Figure 5:
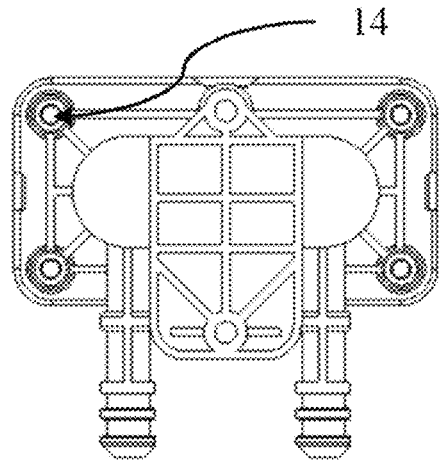
Figure 6:
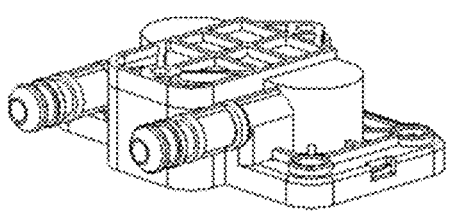
Figure 7:
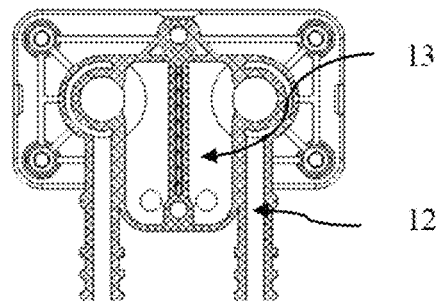

Generally, the liquid feeding pump can include a pump head 1, a pump housing 2 and a pump chamber member 4. The pump head 1 and the pump housing 2 are assembled with each other to form a general architecture in which the pump chamber member 4 and other components of the liquid feeding pump are accommodated. The pump head 1 and the pump housing 2 can be assembled together, for example, by screws, buckles, welding, bonding, etc. The drawing shows that the pump head 1 and the pump housing 2 are assembled by fasteners 7, and FIG. 5 shows a fastener mounting portion 14 of the pump head 1. This disclosure does not exclude other assembling methods. In addition, the pump head 1 and the pump housing 2 can be integrally formed.

An exemplary structure of the pump housing 2 can be seen in FIGS. 8-13. FIG. 10 is a sectional view taken along line A-A of FIG. 9, and FIG. 11 is an enlarged view of area B of FIG. 10, which shows a convex sealing structure for sealing the hydraulic chamber 9. The pump housing 2 defines a hydraulic chamber 9 which accommodates the pump chamber and can generate a hydraulic pressure. In the exemplary embodiment shown in the drawings, there are two hydraulic chambers 9 and two pump chambers. However, the number of hydraulic chambers 9 and pump chambers can be one or more than two according to actual needs. The pump housing 2 also defines a water inlet portion 10 and a water outlet portion 11 in communication with the hydraulic chamber 9. The water inlet portion 10 is configured to allow a first liquid to enter the hydraulic chamber 9, and the water outlet portion 11 is configured to allow a first liquid to be discharged from the hydraulic chamber 9. In the implementation that the liquid feeding pump is applied to a laundry machine or a dishwasher, the first liquid is generally water, such as tap water.

The specific structures of the water inlet portion 10 and the water outlet portion 11 of the pump housing 2 are not limited, but it is exemplary that as shown in the drawings, they include a pipe or in the form of a pipe as a whole, and its pipes can be called water inlet pipe and water outlet pipe respectively. In some embodiments, both the water inlet portion 10 and the water outlet portion 11 are located at the bottom of the pump housing 2, and the water inlet pipe may be higher than the water outlet pipe. In the exemplary implementation shown in the drawings, the water outlet pipe is located at the bottom of the hydraulic chamber 9 of the pump housing 2, thus facilitating water discharge.

The pressurization of the hydraulic chamber 9 of the pump housing 2 is carried out by adopting one of the following two schemes or in combination: 1) the sectional area of a water outlet of the water outlet portion 11 is smaller than that of a water inlet of the water inlet portion 10; 2) the pump chamber member 4 is provided with a pressurization plug 23, which can extend into the water inlet portion 10 and cause the pump chamber volume to change by directly pressurizing at the water inlet portion 10.

The pump chamber member 4, which has a pump chamber isolated from the hydraulic chamber 9, is arranged in the hydraulic chamber 9 of the pump housing 2. In the exemplary embodiments shown in the drawings, the pump chamber is at least partially inside the hydraulic chamber 9. The pump chamber is variable in volume, and communicates with the liquid inlet portion 12 and the liquid outlet portion 13 of the liquid feeding pump. When the pump chamber expands, a second liquid enters the pump chamber through the liquid inlet portion 12, and when the pump chamber contracts, the second liquid is pumped out from the pump chamber through the liquid outlet portion 13. The second liquid is pumped out of the pump chamber. The second liquid is the liquid to be pumped and may be laundry detergent, laundry softener, dishwashing agent, etc.

The pump chamber member 4 has a fixed end and a movable end defining the pump chamber, wherein the fixed end is fixedly arranged relative to the pump housing 2, while the movable end is movable relative to the fixed end between a compressed position and an expanded position to change the volume of the pump chamber. That is, when the movable end is in the compressed position closer to the fixed end, the pump chamber is compressed, and the second liquid in the pump chamber can be pumped out of the pump chamber through the liquid outlet portion 13. When the movable end is in the expanded position and relative remote from the fixed end, the pump chamber is expanded and the second liquid can be sucked into the pump chamber through the liquid inlet portion 12.

The movable end of the pump chamber member 4 is located in the hydraulic chamber 9 of the pump housing 2 and downstream of the water inlet portion 10, so that when the first liquid enters the hydraulic chamber 9 from the water inlet portion 10, the hydraulic pressure provided by the first liquid pushes the movable end toward its compressed position to compress the pump chamber, and then the second liquid is pumped out. When the supply of the first liquid is stopped, for example, when the supply of water is stopped, the first liquid in the hydraulic chamber 9 is discharged from the water outlet portion 11, and the movable end of the pump chamber member 4 returns to its expanded position due to gravity or acting force of a returning member, so that the pump chamber is expanded, and thus the second liquid can be sucked into the pump chamber through the liquid inlet portion 12. Through such cycles, the liquid feeding pump can repeatedly suck in and discharge liquid.

Figure 4:
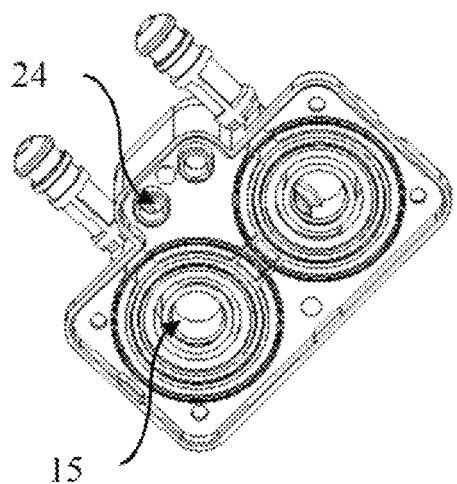
FIGS. 4-7 show a pump head for the liquid feeding pump proposed in this disclosure from different perspectives and views.

This disclosure does not limit the specific positions and structures of the liquid inlet portion 12 and the liquid outlet portion 13 mentioned above. However, in an exemplary implementation, both the liquid inlet portion 12 and the liquid outlet portion 13 are arranged on the pump head 1. An exemplary structure of the pump head 1 can be seen in FIGS. 4-7. The liquid inlet portion 12 may include a liquid inlet chamber provided in the pump head 1 and including a liquid inlet chamber pipe. The liquid outlet portion 13 may include a liquid outlet chamber provided in the pump head 1, and an outlet 24 of the liquid outlet chamber is located at bottom of the pump head 1, and facing toward the pump housing 2, as shown in FIG. 4, so as to be communicated to a mixing chamber 16 through a liquid guiding duct 17 to be described later.

The numbers of the liquid inlet portion 12 and of the liquid outlet portion 13 of the pump 1 can be one or more, and the liquid inlet portion and the liquid outlet portion do not have to be provided in pairs, but can be provided according to actual requirements. In the exemplary scheme shown in the drawings, the numbers of liquid inlet portion 12 and of liquid outlet portion 13 are both two.

According to an exemplary implementation, the pump chamber member 4 includes a bellows 20, and the fixed end and the movable end of the pump chamber member 4 are one of the opposite ends of the bellows 20, respectively. The interior of the bellows 20 forms the pump chamber. A separate mounting part and a separate movable part can be respectively provided on either end of the bellows 20. The mounting part is fixedly connected with the pump housing 2, forming the fixed end of the pump chamber member 4, and the movable part forming the movable end. The movable end is located downstream of the water inlet portion 10. A pump chamber isolated from the hydraulic chamber 9 is defined inside the bellows 20.

Compared with a plunger pump, this embodiment has many advantages by using bellows 20. Compared with a plunger pump, the bellows 20 provides better sealing performance and avoids friction and wear between the plunger pump and the pump chamber. The liquid feeding pump adopting the bellows 20 has a long service life, low requirement for the sealing dimensional accuracy of the pump chamber, and wider applicable hydraulic pressure range.

However, the pump chamber of this embodiment is not limited to the type of bellows, but can be the type of piston, plunger or diaphragm, as long as it provides a pump chamber which can be driven by hydraulic pressure to change its volume.

Figure 15:
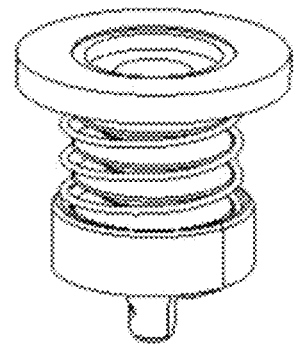
FIGS. 15-17 show a pump chamber member for the liquid feeding pump proposed in this disclosure from different perspectives and views.
Figure 16:
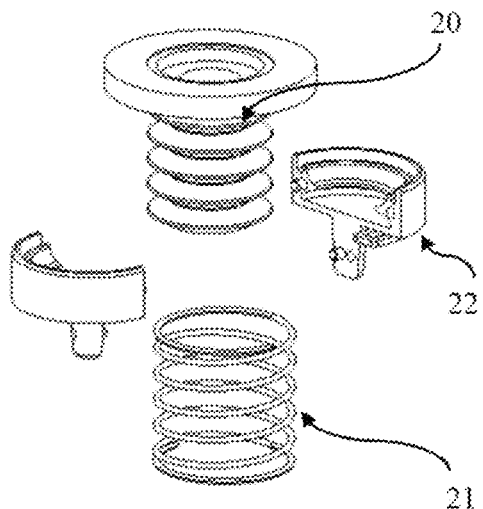

According to an exemplary embodiment, the liquid feeding pump also includes a returning member 5 configured to bias the movable end toward its expanded position to assist the pump chamber to return to the expanded position and realize liquid sucking function. FIGS. 15-16 show an overall view and an exploded view of the returning member 5, respectively. In some embodiments, the returning member 5 is a coil spring or other elastic member. The returning member 5 can be provided between and pressed against the fixed end and the movable end of the pump chamber member 4 to bias the movable end away from the fixed end. Alternatively, one end of the returning member 5 can be arranged on the pump chamber member 4, and the other end can be arranged on other fixed parts, as long as it can bias the movable end of the pump chamber member 4 away from the fixed end. The pump chamber member 4 can be provided with a returning member mounting seat 22 for mounting the returning member 5, as shown in FIG. 16. However, the present disclosure can also adopt other returning mechanisms, such as returning by gravity.

Figure 14:
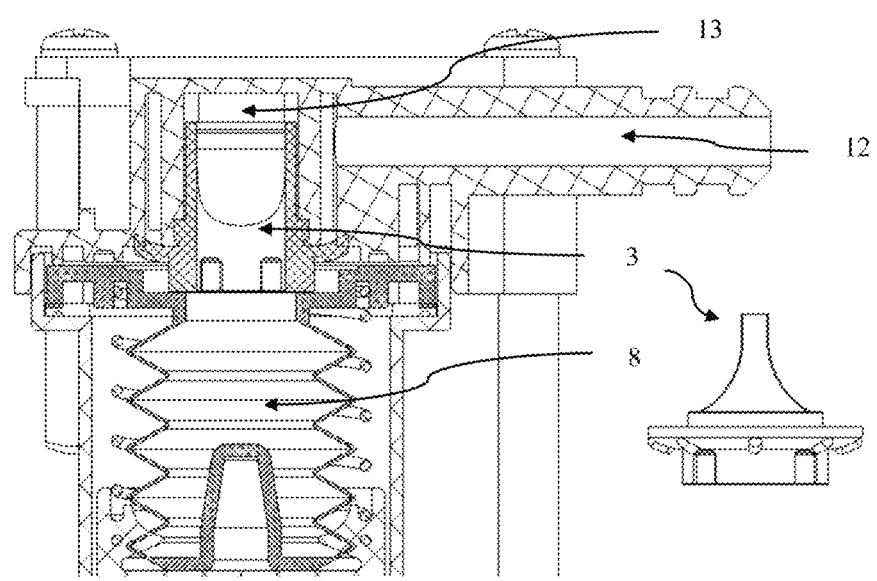
FIG. 14 shows a partial cross-sectional view of some exemplary embodiments of the liquid feeding pump proposed in the present disclosure, and particularly shows a one-way valve.

The liquid feeding pump can also include a one-way valve 3 for blocking the liquid inlet chamber, the pump chamber and the liquid storage chamber inside the liquid feeding pump system. The one-way valve 3 can be a combined one-way valve, such as that shown in FIG. 14, which is configured to communicate the liquid inlet chamber with the pump chamber when the pump chamber is expanded to allow the liquid pump to suck liquid, and to communicate the liquid outlet chamber with the liquid outlet chamber when the pump chamber is compressed to allow the liquid feeding pump to discharge liquid. Alternatively, a first one-way valve can be arranged between the liquid inlet chamber and the pump chamber. The first one-way valve is configured to allow liquid to enter the pump chamber from the liquid inlet chamber when the pump chamber expands and prevent liquid from entering the liquid inlet chamber from the pump chamber. A second one-way valve is arranged between the liquid outlet pump and the pump chamber. The second one-way valve is configured to allow liquid to enter the liquid outlet chamber from the pump chamber when the pump chamber contracts and prevent liquid from entering the liquid outlet chamber. The pump head can be provided with a special one-way valve mounting portion 15 for mounting the one-way valve.

The liquid feeding pump may further comprise a seal 6, which is used to seal the joint of parts in the liquid feeding pump system. The pump housing 2 and the pump head 1 can be provided with corresponding seal mounting portions. FIGS. 18-20 particularly show the seal mounting position S at the pump housing 2 and the pump head 1. This disclosure does not limit the specific mounting position of the seal, as long as the hydraulic chamber 9, pump chamber, etc. can have a good sealing.

According to an exemplary embodiment, the liquid feeding pump further comprises a stopping means which is fixedly arranged relative to the fixed end and limits the position to which the movable end can be moved, that is, limiting the stroke of the movable end between the compressed position and the expanded position. That is, the stopping means limits the maximum compressed position and the maximum returning position of the pump chamber member 4. The function of the stopping means is to limit the volume change of the pump chamber member 4 during its operation, so as to ensure the stability of dispensing amount each single time. The forces generated by different hydraulic pressures on the pump chamber in the hydraulic chamber 9 may not be the same. If there is no stopping feature, the deformation of the pump chamber cannot be limited, resulting in an inaccurate dispensing amount.

Figure 22:
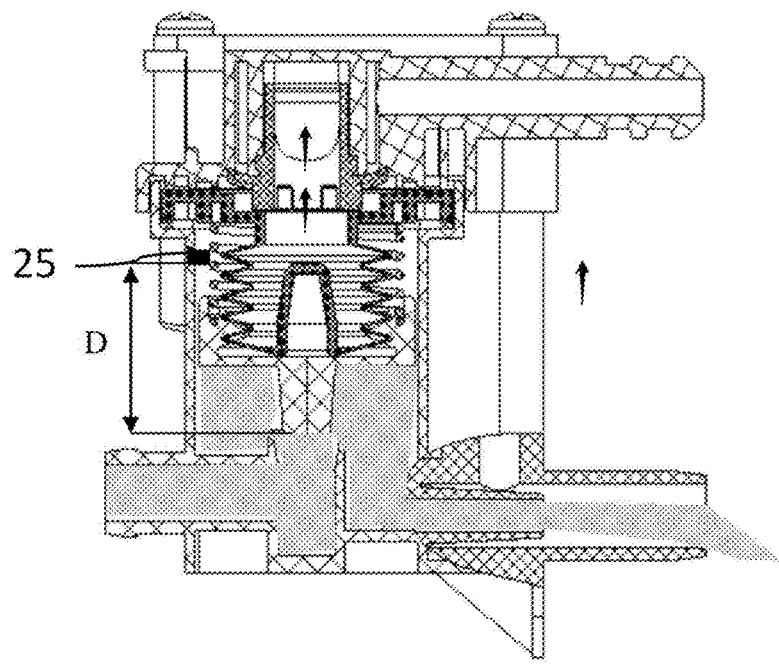

Specifically, the stopping means includes a first stopping portion 25 defining the compressed position of the movable end and a second stopping portion 26 defining the expanded position of the movable end. The first stopping portion 25 may be a stopper fixed to the pump housing 2 or the pump chamber member 4, as shown in FIG. 22. Referring to FIG. 10, the second stopping portion 26 may be a part of the water inlet pipe. The water inlet pipe is generally horizontally arranged and comprises a pipe portion arranged in a vertical direction that may constitute the second stopping portion 26.

According to an exemplary embodiment, the distance D between the first stopping portion 25 and the second stopping portion 26 is smaller than the distance that the movable end can be moved relative to the fixed end at a minimum working hydraulic pressure without a stopping portion. In the case with a returning member, the distance D between the first stopping portion 25 and the second stopping portion 26 is smaller than the amount of deformation of the returning member at the minimum operating hydraulic pressure. That is to say, even under the minimum operating hydraulic pressure, it can be ensured that the movable end of the pump chamber member 4 can move from the second stopping portion 26 to the first stopping portion 25 when the liquid is pumped out from the liquid feeding pump. This restriction can ensure a constant volume change of the pump chamber under different operating hydraulic pressures every time, and thus ensure an accurate dispensing amount each single time.

Figure 17:
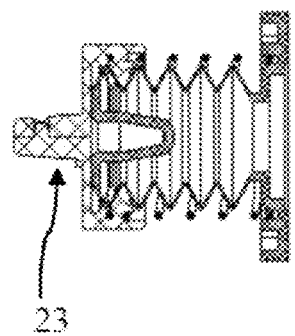

According to an exemplary embodiment, the liquid feeding pump also comprises a pressurizing plug 23 extending from the movable end of the pump chamber member 4 into the hydraulic chamber 9, as shown in FIG. 17. The pressurizing plug 23 moves with the movable end. In a rest state, that is, without hydraulic pressure, the pressurizing plug 23 extends into the water inlet portion 10 of the pump housing 2, as shown in FIG. 3. The pressurization plug 23 can directly realize pressurization at the water inlet portion 10, and drive the volume of the pump chamber to change. In an exemplary embodiment, the water inlet portion 10 includes a water inlet pipe formed in the pump housing 2, and the pressurizing plug 23 is arranged to be inserted into the water inlet pipe from a side wall of the water inlet pipe when the movable end is in the expanded position.

According to an exemplary embodiment, the pump housing 2 is also formed with a liquid guiding tube 17 which communicates the liquid outlet portion 13 with the water outlet portion 11, as shown in FIGS. 10 and 12. The liquid guiding tube 17 can be arranged such that its inlet 18 is close to the pump head 1 to receive the second liquid from the liquid outlet portion, and its outlet 19 is close to the water outlet portion 11 to direct the second liquid to the vicinity of the water outlet portion 11 for mixing. Therefore, in an exemplary embodiment, the pump housing 2 is also formed with a mixing chamber 16 located downstream of both the outlet of the liquid guiding tube 17 and the water outlet portion 11, and the first liquid and the second liquid are mixed in the mixing chamber 16. In this way, the liquid guiding tube 17 directs the second liquid to be pumped to the outlet of the first liquid, so that the two can be fully mixed in the mixing chamber 16.

For the implementation in which the liquid inlet portion 12 and the liquid outlet portion 13 are located in the pump head, the liquid outlet portion 13 may include or be formed as a liquid outlet chamber located in the pump head, and the outlet of the liquid outlet chamber is open to the liquid guiding tube 17 located in the pump housing 2.

According to another exemplary embodiment, there is no liquid guiding tube on the pump housing of the liquid feeding pump. For example, FIG. 27-29 shows a specific embodiment of a liquid feeding pump with a pump housing having no liquid guiding tube. For such embodiment, the second liquid can be directed to the vicinity of the water outlet portion 11 for mixing by an externally provided liquid guiding tube. For example, such a liquid guiding tube can be provided on the housing of the dispensing system including the liquid feeding pump.

In some embodiments, the mixing chamber 16 is in the form of a mixing chamber pipe formed by the pump housing 2 itself, and the water outlet pipe is arranged such that its outlet is aligned with the mixing chamber pipe. Thereby the mixing of the first liquid and the second liquid is facilitated.

The working principle of the liquid feeding pump will be explained below by taking the case in which the liquid feeding pump is applied to the laundry machine as an example. This is similar to the case that the liquid feeding pump is applied to other electrical appliances.

Initial State:

The water inlet portion 10 of the automatic liquid feeding pump is connected with the water outlet of the water inlet valve of the laundry machine, and the water inlet of the water inlet valve of the laundry machine is connected with the tap water network. In the initial state, the water inlet valve is closed, there is no hydraulic pressure in the hydraulic chamber 9 of the automatic liquid feeding pump, and the pump chamber member 4 is in the initial state under the action of the returning member, and the movable end of the pump chamber member 4 is in the extended position at this time.

Sucking Process:

The water inlet valve is opened, and water flow enters the hydraulic chamber 9 through the water inlet portion 10 of the automatic liquid feeding pump. Due to the pressurization of the pressurization plug 23 or the water outlet portion of the pump housing, a force for compressing the pump chamber member 4 is generated in the hydraulic chamber 9, and the movable end of the pump chamber is moved towards the compressed position, so that the pump chamber is compressed to store energy.

After the water inlet valve is closed, the water in the hydraulic chamber 9 flows out of the pump housing 2 through the water outlet portion 11, and the pump chamber releases its stored energy under action of automatic returning mechanism such as a returning member or power, and the movable end of the pump chamber member 4 moves towards its expanded position, so that the volume of the pump chamber increases, the pressure in the pump chamber is less than that of the inlet chamber, and solution in the inlet chamber enters the pump chamber through the one-way valve 3.

FIG. 21 shows the flow path of the solution in the sucking process with dark arrows, and shows the movement of the pump chamber from the compressed position to the expanded position under the action of the returning member or other returning mechanism. At this time, the water inlet valve stops water supply and the water in the hydraulic chamber 9 naturally flows out for pressure relief, and the hydraulic pressure supporting the pump chamber member 4 disappears, so that the pressurization plug 23 falls back to the water inlet portion 10 to prepare for pressurization of intake water next time. In addition, the two upward-pointing arrows in FIG. 26 show the flow direction of the incoming liquid.

Pumping Out Process:

After the above-mentioned sucking process is completed, the water inlet valve is reopened, and the water flow quickly enters the hydraulic chamber 9 again through the water inlet portion 10 of the automatic liquid feeding pump. Due to the pressurization effect of the pressurization plug 23 or the water outlet portion 11 of the pump housing 2, a force for compressing the pump chamber member 4 is generated in the hydraulic chamber 9, the movable end of the pump chamber is moved to the compressed position, the pump chamber is compressed, the pressure in the pump chamber is greater than that of the liquid outlet chamber, and the solution in the pump chamber is pumped from the pump chamber to the liquid outlet chamber through the one-way valve 3.

Figure 23:
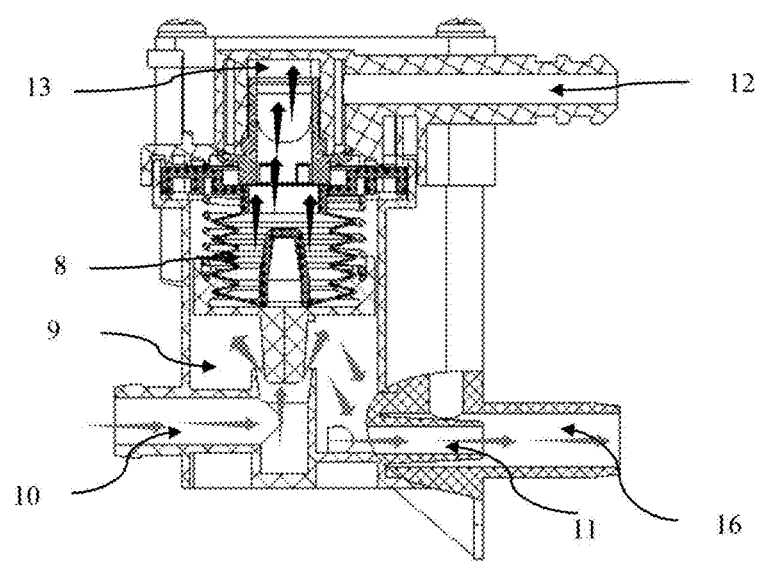
Figure 24:
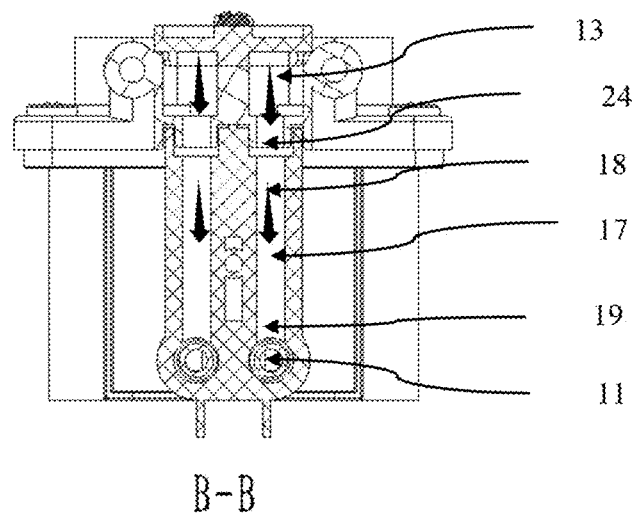
Figure 25:
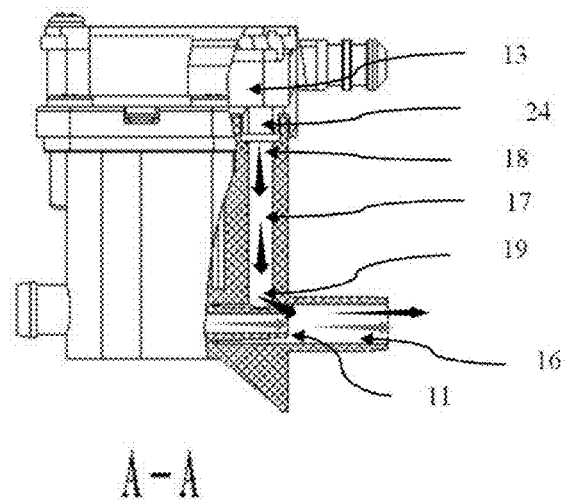

FIG. 23 shows the flow path of the second solution pumped out with dark arrows and the path of water flow with light arrows. FIG. 22 shows a state where the hydraulic chamber 9 is substantially full of water. Specifically, the hydraulic chamber 9 is instantly pressurized due to the fact that the water inlet valve allows water to flow through, and the pressurizing plug 23 is lifted out by the hydraulic pressure, which drives the pump chamber to compress to an upper limit of the pump chamber so as to pumps the solution in the pump chamber out. At the same time, the water from the water inlet valve allows the water flow to enter an inner tub of the laundry machine through the water outlet portion 11 of the pump housing 2 for washing. The arrow pointing downward and left and the arrow pointing downward in FIG. 26 show the flow of the liquid pumped out in the liquid outlet chamber towards the liquid guiding tube 17. FIG. 24 shows the flow-guiding function of the liquid guiding tube 17 when the liquid is discharged, and FIG. 25 shows the flow directions and mixing of the two liquids.

In the process of water intake of laundry machine, if the water inlet valve is in a long-open state, the pump chamber is in energy storage state for a long time, and its volume will not change alternately, so it will not pump out liquid continuously. At this moment, the water inlet valve is used to continuously feed water into the inner tub of the laundry machine to provide washing water.

The disclosure also provides a dispensing system, which comprises a liquid storage box with an inner box and an outer box, and the liquid feeding pump described above, wherein a liquid inlet of the liquid feeding pump is connected to the inner box to extract liquid from the inner box, and a liquid outlet and a water outlet of the liquid feeding pump are both connected to the outer box. The dispensing system can be used in a laundry machine, wherein, the inner box can be drawn out relative to the laundry machine to allow the user to add detergent, and the outer box is fixed relative to the laundry machine. The outlet of the outer box of the dispensing system is communicated with the washing tub of the laundry machine to dispense the solution stored in the outer box into the washing tub of the laundry machine as required.

An automatic control method can be provided for operating the liquid feeding pump proposed in this disclosure. The method may include the following steps.

S1: determining the target amount of the second liquid to be pumped out. For example, when applied to a laundry machine, the target amount of the second liquid, such as detergent or softener, can be determined according to the mode of the laundry machine.

S2: determining a target pumping times according to the target amount and the pump chamber capacity of the liquid feeding pump. The pump chamber capacity of the liquid feeding pump refers to the dispensing amount v of the liquid feeding pump each single time. For the case with a stopping portion, the dispensing amount each single time is also limited by the position of the stopping portion. If the total amount of solution to be dispensed is V, then the number of target dispensing times is V/v, that is, the number of on-off times of the water inlet valve need to be controlled to be V/v. For the case where the V/v is not an integer, the target dispensing times can be set to the integer part of the V/v or the integer part plus one according to the actual situation.

S3: controlling the opening of the water inlet portion 10 of the liquid feeding pump to allow the first liquid to enter the hydraulic chamber 9 of the liquid feeding pump from the water inlet portion 10 and drive the movable end of the liquid feeding pump towards its compressed position to compress the pump chamber, so as to pump the second liquid out from the liquid outlet portion 13 of the liquid feeding pump.

S4: after the movable end reaches its compressed position, the water inlet portion 10 is controlled to be closed to allow the movable end to return to its expanded position, so that the second liquid enters the pump chamber from the liquid inlet portion 12.

S5: repeating steps S3-S4 until the target pumping times are reached.

FIGS. 30A-30C show a liquid feeding pump 90 according to some embodiments of the present disclosure, in which the pump chamber member is configured as an integrally molded pump chamber member formed of an elastomer material. The liquid feeding pump 90 includes a pump head 100, a one-way valve assembly 200, a pump chamber member assembly 300 and a pump housing 400. The one-way valve assembly 200 includes a one-way valve 210 and a one-way valve bracket 240. The pump chamber member assembly 300 includes a pump chamber member 310 and a returning spring 350. The pump head 100 is mounted to the pump housing 400 by six fasteners 132 to form a pump casing for accommodating the pump chamber member assembly 300 and the one-way valve assembly 200, etc. therein. According to the present disclosure, there are other connection ways between the pump head and the pump housing. For example, the pump head 100 can be mounted to the pump housing 400 by fasteners with different numbers and/or positions, or the pump head 100 can be connected to the pump housing 400 by bolts, buckles, welding, bonding, etc.

FIGS. 31A-31D illustrate a pump head 100 according to some embodiments of the present disclosure. The pump head 100 includes a pump head body 102, two pairs of liquid inlet portions 110 and liquid outlet portions 120 connected to the pump head body 102 from the upper side of the pump head body 102. The pump head 100 also includes a fastener mounting portion 134, such as a bolt hole, provided in the pump head body 102, through which the fastener 132 fastens the pump head 100 to the pump housing 400. The bottom side of the pump body 102 is provided with two recesses 140 corresponding to the two pairs of liquid inlet portions 110a and liquid outlet portions 120a, respectively. Each recess 140 is provided with a one-way valve mounting portion 142 and a one-way valve bracket mounting portion 146 for mounting the one-way valve and the one-way valve bracket.

Each recess 140 of the pump body 102 defines a liquid inlet chamber 114 and a liquid outlet chamber 124 respectively. As shown in the figure, each liquid outlet chamber 124 is located at the center of a respective recess 140, and the liquid inlet chamber 114 is arranged to surround the liquid outlet chamber 124. Each liquid inlet portion 110 defines a liquid inlet channel 112, which is in fluid communication with a liquid inlet chamber 114. Each liquid outlet 120 defines a liquid outlet channel 122, which is in fluid communication with a liquid outlet chamber 124. As shown in FIG. 31B, when sucking, the liquid enters the liquid inlet chamber 114 through the liquid inlet channel 112 of the liquid inlet portion 110, as indicated by the solid arrow. When discharged, the liquid is discharged from the liquid outlet chamber 124 through the liquid outlet channel 124 of the liquid outlet portion 120, as shown by the dashed arrow.

FIGS. 32A-32D illustrate a pump housing 400 of a liquid feeding pump according to some embodiments of the present disclosure. The pump housing 400 includes a pump housing body 410, two water inlet portions 450 and two water outlet portions 460 (only one water outlet portion is shown) connected to the pump housing body 410. The pump housing 400 also defines two hydraulic chambers 420, each of which is in fluid communication with a corresponding water inlet portion 450 and a water outlet portion 460. In some embodiments, the cross-sectional area of the water inlet portion of the hydraulic chamber 420 is larger than that of the water outlet portion 460, so that the water amount and hydraulic pressure in the hydraulic chamber 420 will gradually increase during water intake to generate the pressure for compressing the pump valve member 310. In some embodiments, the water inlet portion of the hydraulic chamber 420 is set higher than the water outlet portion 460. In some embodiments, the water outlet portion 460 is arranged at the lowest level of the hydraulic chamber 420. Near the open end of each hydraulic chamber 420, there is a pump chamber member mounting portion 422 for mounting the pump chamber member. According to some embodiments of the present disclosure, the pump chamber member mounting portion 422 is in the form of a waist hole. The bottom of each hydraulic chamber 420 is provided with a stopping structure 440 for limiting the maximum deformation of the pump chamber member. The bottom of each hydraulic chamber 420 is also provided with a pump chamber member mounting portion 444.

As shown, the liquid feeding pump 90 according to some embodiments of the present disclosure includes two one-way valve assemblies and two pump chamber member assemblies. Accordingly, the pump head 100 of the liquid feeding pump 90 includes two pairs of liquid inlet portions and liquid outlet portions, and the pump housing 400 is provided with two hydraulic chambers 420, two water inlet portions and two water outlet portions. However, the present disclosure is not limited thereto, and the liquid feeding pump according to some other embodiments of the present disclosure may have different numbers of one-way valve assemblies and pump chamber member assemblies, such as one one-way valve assembly and one pump chamber member assembly, or three one-way valve assemblies and three pump chamber member assemblies. In these embodiments, the pump head also has a corresponding number of liquid inlet portions and outlet members, and the pump housing also has a corresponding number of hydraulic chambers, water inlet portions and water outlet portions. According to some other embodiments of the present disclosure, the liquid inlet portion and the liquid outlet portion of the pump head may not be arranged in pairs.

FIGS. 33A-33C illustrate the one-way valve 210 and its mounting bracket according to some embodiments of the present disclosure. The one-way valve 210 is an integral part made of elastomer material, and includes a body portion 212, which is substantially cylindrical. The one-way valve 210 also includes notches 214 provided in the lower part of the body portion 212 for fitting to the one-way valve bracket. The one-way valve 210 also includes a valve nozzle 216 extending upward from the body portion 212 and a valve flap 218 extending radially outward from the body portion 212. As shown, the valve nozzle 216 is in a normally closed state. When the fluid pressure of the liquid outlet chamber 124 is greater than that of the pump chamber 314, the fluid pressure of the liquid outlet chamber 124 will further close the valve nozzle 216. When the fluid pressure in the pump chamber 314 is greater than that in the liquid outlet chamber 124, the fluid pressure in the pump chamber 314 will open the valve nozzle 216. Therefore, the valve nozzle 216 blocks the liquid flow from the outlet chamber 124 to the pump chamber 314 of the pump valve member 310, while allowing the fluid flow from the pump chamber 314 to the liquid outlet chamber 124. The valve flap 218 abuts against the inlet chamber 114 in its rest configuration. When the fluid pressure of the pump chamber 314 of the pump valve member 310 is greater than that of the liquid inlet chamber 114, the fluid pressure of the pump chamber 314 further presses the valve flap 218 against and seals the liquid inlet chamber 114. When the fluid pressure of the liquid inlet chamber 114 is greater than that of the pump chamber 314, the fluid pressure of the liquid inlet chamber 114 pushes the valve flap 218 away from the liquid inlet chamber 114. Therefore, the valve flap 218 allows the liquid flow from the liquid inlet chamber 114 to the pump chamber 314 of the pump valve member 310, while preventing the fluid flow from the pump chamber 314 of the pump valve member 310 to the liquid inlet chamber 114.

FIG. 33C shows the one-way valve bracket 240. The one-way valve bracket 240 is an inelastic element with a certain hardness, and includes an inner cylinder 242, an outer ring 244, and a plurality of webs 246 extending between the inner cylinder 242 and the outer ring 244. The webs 246 of the one-way valve bracket 240 is snap-fitted in the notches 214 of the one-way valve 210 for connecting the one-way valve 210 to the one-way valve bracket 240. In such position, the radially outer wall of the inner cylinder 242 is engaged with the body portion 212 of the one-way valve 210. The inner cylinder 242 has a central hole for providing a flow channel between the liquid outlet chamber 124 and the pump chamber 314 of the pump valve member 310. The outer ring 244 is provided with a plurality of bosses 248, and the bosses 248 are interference fitted into corresponding grooves of the pump head for fixedly connecting the one-way valve bracket 240 and the one-way valve 210 connected to the one-way valve bracket 240 to the pump head 100.

FIGS. 33A-33C show a specific structure of the one-way valve 210 and its mounting bracket according to some embodiments of the present disclosure, however the present disclosure is not limited thereto. According to other embodiments of the present disclosure, the one-way valve 210 and/or the one-way valve bracket may have any suitable form as long as it can realize the function of the one-way valve. For example, according to some embodiments of the present disclosure, the one-way valve may have any suitable form as long as its integrally molded elastomer material includes a first portion that allows unidirectional flow from the liquid inlet chamber (liquid inlet portion) to the pump chamber and a second portion that allows unidirectional flow from the pump chamber to the liquid outlet chamber (liquid outlet portion). In some other embodiments of the present disclosure, the one-way valve is not an integrally molded piece of elastomer material as shown in the figure, but includes two separately formed valve parts, which are respectively used to realize unidirectional flow from the pump chamber 314 to the liquid outlet chamber 124 and unidirectional flow from the liquid inlet chamber 114 to the pump chamber 314. In some other embodiments of the present disclosure, the one-way valve bracket may have any suitable form as long as it can properly fix the one-way valve to the pump head of the liquid feeding pump.

FIGS. 34A-34C illustrate a pump chamber member 310 according to some embodiments of the present disclosure. The pump chamber member 310 is an integral piece formed of an elastomer material. The pump chamber member 310 includes an axis x as shown by the broken line in FIG. 34A and a cylindrical body 312 that is retractable along the axial direction. The pump chamber member 310 also includes a bottom wall 316. The bottom wall 316 and the cylindrical body 312 can be collectively referred to as pump chamber body and together define the pump chamber 314. The pump chamber member 310 also includes a pump chamber member mounting portion 320 extending radially outward from the cylindrical body 312 near an open end of the cylindrical body. The pump chamber member mounting portion 320 has a generally annular disk-like structure and has upper bosses 322 and lower bosses 324 at or near the radially outer end. As shown in the figures, the cylindrical body 312 has a corrugated structure to facilitate the expansion and compression deformation of the cylindrical body 312 along the axial direction. The pump chamber member 310 also includes an elongated tail 330 extending in the axial direction from the bottom wall 316 of the cylindrical body 312. The elongated tail 330 includes a positioning structure 332 spaced apart from the cylindrical body 312 for being fixed to the pump chamber member mounting portion 444.

FIGS. 34B-34C show the rest configuration (first configuration) and compressed configuration (second configuration) of the pump chamber member 310. As shown in FIGS. 34B-34C and combined with FIGS. 30B-30C, the pump chamber member mounting portion 320 is clamped between the pump head 100 and the pump housing 400, wherein the lower bosses 324 of the pump chamber member mounting portion 320 are fitted into a corresponding pump chamber member mounting portion 422 (grooves in the illustrated embodiment) of the pump housing 400, and the upper bosses 322 are fitted into a groove formed by the pump housing 400, the pump head 100 and the one-way valve bracket 240. Therefore, the pump chamber member mounting portion 320 is firmly connected to the pump head 100 and the pump housing 400 and achieves reliable fluid seal between the pump head 100 and the pump housing 400, so that the pump chamber 314 is fluidly isolated from the hydraulic chamber 420. The corrugated structure of the cylindrical body 312 is favorable for its expansion and compression deformation along the axial direction, so that the pump chamber member 310 can move between the rest configuration or the first configuration as shown in FIG. 34B and the compressed configuration or the second configuration as shown in FIG. 34C. In the rest configuration or the first configuration shown in FIG. 34B, the pump chamber 320 of the pump chamber member 310 has a larger first volume, and in the compressed configuration or the second configuration shown in FIG. 34C, the pump chamber 320 of the pump chamber member 310 has a smaller second volume. The movement or repeated movement of the pump chamber member 310 between the first configuration and the second configuration can realize the pumping action.

The elongated tail 330 extends from the bottom wall 316 of the cylindrical body 312 in the axial direction, and is fixed to the pump chamber member mounting portion 444 by the positioning structure 332 thereon. In the rest configuration or the first configuration shown in FIG. 34B, the cylindrical body 312 and the elongated tail 330 of the pump chamber member 310 are in their natural or substantially natural state. In the compressed configuration or the second configuration shown in FIG. 34C, the cylindrical body 312 of the pump chamber member 310 is in a compressed state, and the elongated tail 330 is in its stretched state. The compressed cylindrical body 312 and the stretched elongated tail 330 together provide a biasing force to bias the pump chamber member 310 toward its rest configuration or first configuration. Meanwhile, the elongated tail 330 also helps to ensure that the expansion and compression of the cylindrical body 312 of the pump chamber member 310 is along its axis, while preventing its expansion and compression from deviating from its axis, thus realizing controlled expansion and compression deformation of the cylindrical body 312.

A stopping structure 440 at the bottom of the hydraulic chamber 420 is used to limit the maximum extension of the cylindrical body 312 of the pump chamber member 310. The stopping structure 440 extends upward from the bottom of the hydraulic chamber 420, and has a substantially cylindrical shape. The substantially cylindrical hollow interior of the stopping structure 440 allows the elongated tail 330 to extend therethrough. The height of the stopping structure 440 is set such that the bottom wall 316 of the cylindrical body 312 is in contact with an upper edge of the stopping structure 440 in the rest configuration or the first configuration of the pump chamber member 310, so as to prevent the pump chamber member 310 from over-expansion.

The combination of the elastic material of the pump chamber member, the corrugated structure of the cylindrical body 312, the elongated tail 330 and the stopping structure 440 can ensure the good repeatability of the expansion and compression of the pump chamber, thus ensuring the quantitative liquid dispensing of the liquid feeding pump.

FIGS. 35A-35C illustrate the returning spring of the pump chamber member assembly according to some embodiments of the present disclosure. The pump chamber member assembly shown in FIG. 35A includes a pump chamber member 310 and a returning spring 350. The returning spring 350 is located in the pump chamber 314, with its upper end engaged with the one-way valve bracket 240 and its lower end engaged with the bottom wall 316 of the pump chamber member 310. When the pump chamber member 310 is in the second or compressed configuration, the returning spring 350 is also in its compressed configuration, thereby biasing the pump chamber member 310 toward the first or rest configuration when the pump chamber member 310 is in the second or compressed configuration. The pump chamber member assembly shown in FIG. 35B includes the pump chamber member 310 and a returning spring 350', and FIG. 35C shows the liquid outlet pump 10' including the returning spring 350'. The returning spring 350' is basically similar to the returning spring 350, except that the returning spring 350' is located outside the cylindrical body 312 of the pump chamber member 310, its upper end being engaged with the pump chamber member mounting portion 320, while its lower end being engaged with the bottom wall 316 of the pump chamber member 310. FIGS. 35A-35C illustrate a returning spring according to some disclosed embodiments. However, the present disclosure is not limited thereto. In other embodiments according to the present disclosure, the pump chamber member assembly may not include a returning spring, but only use the elasticity of the pump chamber member itself to realize the return, for example, by the corrugated structure of elastic material of the cylindrical body of the pump chamber member and/or the elongated tail of the elastic material.

The following describes the assembly process of the liquid feeding pump. The pump head 100 and the pump housing 400 are fastened and assembled with each other (not limited to screws, buckles, welding and bonding, etc.) to form the pump casing of the liquid feeding pump for containing internal components. Before the pump head 100 and the pump housing 400 are fastened to each other, the one-way valve 210 is positioned to the one-way valve mounting portion 142 of the pump head 100, and the one-way valve bracket 240 is pressed into the one-way valve bracket mounting portion 146 of the pump head 100 for fixing the one-way valve 210 to the pump head 100. In addition, before the pump head 100 is fastened and assembled with the pump housing 400, the pump chamber member 310 is pre-positioned, so that the lower boss 314 of the pump chamber member mounting portion 320 is positioned in the pump chamber member mounting portion 422 of the pump housing 400, and the end of the elongated tail 330 extends out of the pump housing 400 through the pump chamber member mounting portion 444. When the pump head 100 is assembled with the pump housing 400, the pump chamber member mounting portion 320 of the pump chamber member 310 is clamped between the pump head 100 and the pump housing 400, and compressed to achieve sealing. After the pump head 100 is assembled with the pump housing 400, the elongated tail 330 of the pump chamber member 310 is pulled outward, and the positioning structure 332 of the elongated tail 330 is mated with the pump chamber member mounting portion 444 of the pump housing 400 to realize the positioning of the pump chamber member 310.

FIGS. 36A-36B show cross-sectional views of a liquid feeding pump according to some embodiments of the present disclosure, wherein FIG. 36A shows a sucking process and FIG. 36B shows a pumping process.

The following describes the operation process of the liquid feeding pump.

Initial state: the water inlet portion 450 of the liquid feeding pump 90 is connected to the water outlet member of the water inlet valve of a washing device, and the water inlet of the water inlet valve is connected with a water network. In the initial state, the water inlet valve is closed, and there is no hydraulic pressure in the hydraulic chamber 420 of the liquid feeding pump. At this time, the pump chamber is in the rest configuration or the first configuration.

Sucking process: the water inlet valve is opened, water flows into the hydraulic chamber 420 through the water inlet portion 450 of the liquid feeding pump 90, and the water entering from the water inlet portion 450 gradually accumulates in the hydraulic chamber 420, generating pressure for compressing the pump chamber member 310, so that the pump chamber member 310 is compressed to the compressed configuration or the second configuration, storing energy. After the water inlet valve is closed, the water in the hydraulic chamber 420 flows out through the water outlet portion 460 of the pump housing 400, and the pump chamber member 310 releases the stored energy under the action of the returning spring and/or its own elasticity, so that the volume of the pump chamber member 314 increases and the pump chamber member 310 returns to the rest configuration or the first configuration. At this time, the pressure in the pump chamber 314 is less than that in the liquid inlet chamber 114, and the solution in the liquid inlet chamber 114 is sucked into the pump chamber 314 through the one-way valve 210, as shown in FIG. 36A. The solution in the liquid inlet chamber 114 comes from a liquid storage box (not shown) communicating with the liquid inlet portion. The solution in the liquid storage box is laundry detergent, laundry softener, dishwashing agent, etc.

Pumping process: after the above sucking process is completed, the water inlet valve is reopened, and water flows into the hydraulic chamber 420 again through the water inlet portion 450 of the liquid feeding pump 90. The water entering from the water inlet portion 450 gradually accumulates in the hydraulic chamber 420 again, generating pressure that compresses the pump chamber member 310, so that the pump chamber member 310 is compressed again, making the pressure in the pump chamber 314 greater than the pressure in the liquid outlet chamber 450, so that the solution in the pump chamber 314 is pumped from the pump chamber 314 to the liquid outlet chamber 450 through the one-way valve 210, and then pumped out through the liquid outlet portion 120, see FIG. 36B. In FIG. 36B, the water in the hydraulic chamber 420 is not shown for simplicity.

Water intake process of the washing device: when the water inlet valve is in a long-open state, the pump chamber member 310 is always in an energy storage state, and the volume will not change alternately, so that no liquid is pumped out from the liquid outlet pipe 120 of the liquid feeding pump 90. At this time, the water inlet valve is used to continuously feed water into the washing device and provide washing water.

Quantitative dispensing: a stopping structure 440 is provided in the hydraulic chamber 420 of the pump housing 400 of the liquid feeding pump 90, for limiting the elastic return of the pump chamber. The stopping structure 440 limits the volume change of the pump chamber 10 in the operating process, and ensures a constant amount in each single dispensing. If the above-mentioned amount of each single dispensing is v, and the total amount of solution to be dispensed by the user is V (an integral multiple of v), it is necessary to control the on-off times of the water inlet valve to be: n=V/v.

FIGS. 37A-37B show a liquid feeding pump 90" according to some embodiments of the present disclosure, which includes a returning spring mounting seat, wherein FIG. 37A shows the liquid feeding pump and FIG. 37B shows the returning spring mounting seat. The liquid feeding pump 90" includes a pump chamber member 310' and a returning member mounting seat 360. The pump chamber member 310' is basically similar to the pump chamber member 310, except that the pump chamber member 310' does not include an elongated tail. The returning member mounting seat 360 is formed by splicing two halves, including a bottom wall 368 and a side wall portion 362 extending upward from the periphery of the bottom wall. The bottom wall 368 and the side wall portion 362 are formed with shapes corresponding to the bottom wall of the pump chamber member 310' for receiving and holding the bottom wall of the pump chamber member 310' therein. A reception, such as a groove, for receiving the lower end of the returning spring 350 is also formed on the side wall portion of the returning member mounting seat 360. The returning member mounting seat 360 also includes a positioning portion 364 extending downward from the bottom wall 368. During the expansion and compression of the pump chamber member 310', the lower end of the positioning portion 364 is kept in the substantially cylindrical hollow interior of the stopping structure 440 of the pump housing 400, so as to ensure that the deformation of expansion and compression of the pump chamber member 310' is basically along its axial direction. The contact between the upper end of the stopping structure 440 and the bottom wall of the returning member mounting seat 360 limits the maximum extension of the pump chamber member 310'. The structure and operation of the liquid feeding pump 90" is basically similar to that of the liquid feeding pump 90 except for the pump chamber member 310' and the returning member mounting seat 360, and detailed description thereof is omitted.

FIGS. 38A-38B show a liquid feeding pump 90''' according to other embodiments of the present disclosure, which includes a returning spring mounting seat 370, wherein FIG. 38A shows the liquid feeding pump and FIG. 38B shows the returning spring mounting seat 370. The liquid feeding pump 90''' includes a returning member mounting seat 370. The returning member mounting seat 370 is formed by splicing two halves, including a bottom wall 378 and a side wall portion 372 extending upward from the periphery of the bottom wall. The bottom wall 378 and the side wall portion 372 are formed with shapes corresponding to the bottom wall of the pump chamber member 310 for receiving and holding the bottom wall of the pump chamber member 310 therein. A reception, such as a groove, for receiving the lower end of the returning member is also formed on the side wall portion of the returning member mounting seat 370. The returning member mounting seat 370 also includes a positioning portion 374 extending downward from the bottom wall 378. The bottom wall 378 and the positioning portion 374 of the returning member mounting seat 370 are provided with through holes 376 for the elongated tail 330 of the pump chamber member 310 to extend through. The contact between the upper end of the stopping structure 440 and the bottom wall of the returning member mounting seat 360 limits the maximum extension of the pump chamber member 310. The structure and operation of the liquid feeding pump 90''' is basically similar to that of the liquid feeding pump 90, except for the returning member mounting seat 370, and detailed description thereof is omitted.

According to some other embodiments of the present disclosure, the pump housing 400 includes a second stopping structure in addition to the stopping structure 440. For example, the second stopping structure (not shown) can be added to the pump housing 400 shown in FIGS. 37A-37B and 38A-38B. The second stopping structure is configured to be in contact with the upper edge of the returning member mounting seat in the second configuration of the pump chamber member for limiting the maximum compression of the pump chamber member 310. The stopping structure 440 (also called the first stopping structure) and the second stopping structure are used to limit the pump chamber member body to move only between the first configuration and the second configuration. In one or more embodiments, the stopping structure can also be similar to the first stopping portion 25 and the second stopping portion 26 shown in the previous figures.

FIG. 39 shows a liquid feeding pump 90''' according to some embodiments of the present disclosure. The liquid feeding pump 90''' includes a pump chamber member 310'. The pump chamber member 310' is basically similar to the pump chamber member 310, except that the pump chamber member 310' does not include an elongated tail 330. The liquid feeding pump 90''' may or may not include a returning spring. Except for the pump chamber member 310', the structure and operation of the liquid feeding pump 90''' are basically similar to that of the liquid feeding pump 90, detailed description thereof is omitted.

The disclosed pump chamber member is an integral molded piece of elastomer material. The elastomer material can be rubber, such as EPDM rubber or silicone rubber. The pump chamber member disclosed by the disclosure has excellent elastic returning effect and speed within the range of elastic deformation.

Elastomer materials, such as rubber, refer to elastic polymer materials with reversible deformation. It is elastic, can produce large deformation under the action of external force, and can quickly recover to its original state after the external force is removed. Compared with pump chamber members in the prior art which can achieve a quantitative liquid feeding only with returning members and multiple stopping structures, the pump chamber members proposed herein can achieve a quantitative liquid feeding function with a single integral piece by virtue of automatic elastic returning function, so that the cost is reduced, and the number of potential failure points is reduced.

Furthermore, by utilizing the compressibility of the pump chamber member, the pump chamber member mounting portion is arranged between the pump head and the pump housing, and sealing effect can be realized after the two are pressed and assembled. Thus no additional seal is required and the cost is reduced, and the number of potential failure points is reduced.

The combination of the elastic material of the pump chamber member, the corrugated structure of the cylindrical body, the elongated tail and the stopping structure can ensure the good repeatability of the expansion and compression of the pump chamber member, thus ensuring the quantitative liquid feeding of the liquid feeding pump. In some embodiments, a combination selected from the group consisting the elastic material of the pump chamber, the corrugated structure of the cylindrical body, the elongated tail and the stopping structure can ensure that the repeatability of expansion and compression of the pump chamber is within an acceptable range, thus ensuring the quantitative liquid feeding of the liquid feeding pump.

According to some embodiments of the disclosure, the disclosure can be implemented in the following ways.

Item 1: A liquid feeding pump, comprising:
a pump housing (2) defining a hydraulic chamber (9), and a water inlet portion (10) and a water outlet portion (11) communicating with the hydraulic chamber (9), wherein the water inlet portion (10) is configured to allow a first liquid to enter the hydraulic chamber (9), while the water outlet portion is configured to allow the first liquid to be discharged from the hydraulic chamber (9);
a pump chamber member (4) provided in the hydraulic chamber (9), and having a pump chamber (8) that is isolated with the hydraulic chamber (9) as well as a fixed end and a movable end defining the pump chamber (8), wherein the fixed end is fixedly arranged relative to the pump housing (2), while the movable end is movable relative to the fixed end between a compressed position and an expanded position to change the volume of the pump chamber (8),
a liquid inlet portion (12) and a liquid outlet portion (13) which are communicated with the pump chamber (8), wherein the liquid inlet portion (12) is configured to allow a second liquid to enter the pump chamber, while the liquid outlet portion (13) is configured to allow the second liquid to be pumped out from the pump chamber;
wherein the movable end is provided downstream of the water inlet portion (10) in the hydraulic chamber (9), so that when the first liquid enters the hydraulic chamber (9) from the water inlet portion (10), the movable end is urged toward its compressed position to compress the pump chamber, and thus the second liquid is pumped out.

Item 2: The liquid feeding pump of item 1, wherein
the pump chamber member (4) comprises a bellows (20), and the interior of the bellows (20) forms the pump chamber (8).

Item 3: The liquid feeding pump of any one of the preceding items, wherein
the liquid feeding pump further includes a returning member (5) configured to bias the movable end of the pump chamber member toward its expanded position.

Item 4: The liquid feeding pump of any one of the preceding items, wherein
the returning member (5) is a coil spring abutting against the movable end.

Item 5: The liquid feeding pump of any one of the preceding items, wherein
the liquid feeding pump further comprises a stopping means which is fixedly arranged relative to the fixed end and configured to limit the stroke of the movable end between the compressed position and the expanded position.

Item 6: The liquid feeding pump of any one of the preceding items, wherein
the stopping means includes a first stopping portion (25) limiting the compressed position of the movable end and a second stopping portion (26) limiting the expanded position of the movable end.

Item 7: The liquid feeding pump of any one of the preceding items, wherein
the distance (D) between the first stopping portion (25) and the second stopping portion (26) is smaller than the amount of deformation of the returning member (5) at the minimum operating hydraulic pressure.

Item 8: The liquid feeding pump of any one of the preceding items, wherein the first stopping portion (25) is a stopper fixed to the pump housing (2) or the pump chamber member (4).

Item 9: The liquid feeding pump any one of the preceding items, wherein
the water inlet portion (10) includes a water inlet pipe formed in the pump housing (2), and the second stopping portion (26) is formed of a part of the water inlet pipe.

Item 10: The liquid feeding pump of any one of the preceding items, wherein
the liquid feeding pump further comprises a pressurizing plug (23) extending from the movable end into the hydraulic chamber (9).

Item 11: The liquid feeding pump of any one of the preceding items, wherein
the water inlet portion (10) includes a water inlet pipe formed in the pump housing (2), and the pressurizing plug (23) is arranged to be inserted into the water inlet pipe from a side wall of the water inlet pipe when the movable end is in the expanded position.

Item 12: The liquid feeding pump of any one of the preceding items, wherein
the pump housing (2) is further formed with a liquid guiding tube (17) which communicates the liquid outlet portion (13) with the water outlet portion (11).

Item 13: The liquid feeding pump of any one of the preceding items, wherein
the liquid feeding pump also includes a pump head (1) configured to engage the pump housing (2) from the top of the pump housing (2), and the liquid inlet portion (12) and the liquid outlet portion (13) are located in the pump head (1).

Item 14: The liquid feeding pump of any one of the preceding items, wherein
the liquid outlet portion (13) includes a liquid outlet chamber located in the pump head (1), and an outlet of the liquid outlet chamber is open to the liquid guiding tube (17) located in the pump housing (2).

Item 15: The liquid feeding pump of any one of the preceding items, wherein
an outlet (19) of the liquid guiding tube (17) is close to the water outlet portion (11), and the pump housing (2) is further formed with a mixing chamber (16) located downstream of both the outlet of the liquid guiding tube (17) and the water outlet portion (11), the first liquid and the second liquid being mixed in the mixing chamber (16).

Item 16: The liquid feeding pump of any one of the preceding items,
the mixing chamber (16) is in a form of a mixing chamber pipe formed by the pump housing (2), and the water outlet portion (11) includes a water outlet pipe, the water outlet pipe being arranged such that its outlet is aligned with the mixing chamber pipe.

Item 17: The liquid feeding pump of any one of the preceding items, wherein
the water outlet portion (11) is located at the bottom of the hydraulic chamber (9).

Item 18: The liquid feeding pump of any one of the preceding items, wherein
the water outlet portion (11) at its water outlet has a cross-sectional area that is smaller than that of the water inlet portion (10) at its water inlet.

Item 19: A dispensing system, comprising a liquid storage box with an inner box and an outer box, and the liquid feeding pump of any one of the preceding items, wherein a liquid inlet of the liquid feeding pump is connected to the inner box to draw liquid from the inner box, and a liquid outlet and a water outlet of the liquid feeding pump are both connected to the outer box.

Item 20: A laundry machine, comprising the liquid feeding pump according to any one of items 1-18 or the dispensing system according to item 19.

Item 21: The laundry machine of item 20, wherein the water inlet portion (10) of the liquid feeding pump is connected to an outlet of a water inlet valve of the laundry machine, and the first liquid is water and the second liquid is detergent.

Item 22: A method for controlling the liquid feeding pump according to any one of items 1 to 18, comprising the following steps:
S1: determining a target amount of the second liquid to be pumped;
S2: determining a target pumping time according to the target amount and the pump chamber capacity of the liquid feeding pump;
S3: controlling the opening of the water inlet portion (10) of the liquid feeding pump to allow the first liquid to enter the hydraulic chamber (9) of the liquid feeding pump from the water inlet portion (10) and urge the movable end of the liquid feeding pump towards its compressed position to compress the pump chamber, so as to pump the second liquid out from the liquid outlet portion (13) of the liquid feeding pump;
S4: after the movable end reaches its compressed position, the water inlet portion (10) is controlled to be closed to allow the movable end to return to its expanded position, so that the second liquid enters the pump chamber from the liquid inlet portion (12);
S5: repeating steps S3-S4 until the target pumping times are reached.

Item 23: A liquid feeding pump, comprising:
a pump head comprising a liquid inlet portion and a liquid outlet portion;
a pump housing connected to the pump head and defining a hydraulic chamber, the pump housing further comprising a water inlet portion and a water outlet portion in fluid communication with the hydraulic chamber;
a pump chamber member, which is an integral piece made of elastomer material, comprising a pump chamber member mounting portion fixedly connected to the pump housing and/or the pump head and a pump chamber member body at least partially arranged in the hydraulic chamber and defining a pump chamber which is fluidly isolated from the hydraulic chamber, the pump chamber member body being movable between a first configuration in which the pump chamber has a first volume and a second configuration in which the pump chamber has a second volume, wherein the first volume is larger than the second volume;
a one-way valve through which the liquid inlet portion and the liquid outlet portion of the pump head are in fluid communication with the pump chamber.

Item 24: The liquid feeding pump of the preceding items, wherein
the pump chamber member body comprises a stretchable cylindrical body, and the pump chamber member mounting portion is arranged near the open end of the cylindrical body, and is clamped between the pump head and the pump housing.

Item 25: The liquid feeding pump of any one of the preceding items, wherein
the pump chamber member mounting portion comprises an upper boss and/or a lower boss near the radially outer end of the pump chamber member mounting portion, and the upper boss and/or the lower boss are configured to fit into a groove of the pump head and/or the pump housing.

Item 26: The liquid feeding pump of any one of the preceding items, wherein
the cylindrical body includes a corrugated portion.

Item 27: The liquid feeding pump of any one of the preceding items, wherein
the pump chamber member also includes an elongated tail extending from a bottom wall of the cylindrical body in an axial direction of the pump chamber, and the elongated tail includes a positioning structure spaced apart from the cylindrical body and configured to be fixed to the pump housing.

Item 28: The liquid feeding pump of any one of the preceding items, wherein
the pump chamber member has elasticity for biasing the pump chamber member body towards the first configuration.

Item 29: The liquid feeding pump of any one of the preceding items, wherein
the liquid feeding pump also includes a returning spring connected to the pump chamber member for biasing the pump chamber member body toward the first configuration.

Item 30: The liquid feeding pump of any one of the preceding items, wherein
the one-way valve is an integral piece made of elastomer material, and includes a first portion allowing unidirectional flow from the liquid inlet portion to the pump chamber and a second portion allowing unidirectional flow from the pump chamber to the liquid outlet portion.

Item 31: The liquid feeding pump of any one of the preceding items, wherein
the pump housing includes a stopping structure configured to contact the bottom wall of the pump chamber member body at the first configuration of the pump chamber member body for limiting the maximum extension of the pump chamber member body.

Item 32: The liquid feeding pump of any one of the preceding items, wherein
the cross-sectional area of the water inlet portion is larger than that of the water outlet portion.

Item 33: The liquid feeding pump of any one of the preceding items, wherein
the feeding pump further includes a one-way valve bracket for supporting the one-way valve, the one-way valve bracket including an inner cylinder, an outer ring and a plurality of webs extending between the inner cylinder and the outer ring, the outer ring being provided with a plurality of bosses which fit into corresponding grooves of the pump head for fixedly connecting the one-way valve to the pump head.

Item 34: The liquid feeding pump of any one of the preceding items, wherein
the liquid feeding pump comprises a returning member mounting seat connected to the bottom wall of the pump chamber member body, wherein the returning member mounting seat receives one end of the returning spring,
wherein the pump housing further comprises a stopping structure configured to contact with the returning member mounting seat in the first configuration of the pump chamber member for limiting the maximum extension of the pump chamber member.

Item 35: A dispensing system, which includes a liquid feeding pump of any one of the preceding items, and a liquid storage box communicated with the liquid inlet portion of the liquid feeding pump.

Item 36: A washing device, wherein the washing device comprises the dispensing system according to item 35.

Item 37: The washing device according to item 36, wherein the washing device is a laundry machine or a dishwasher.

The above description is only an exemplary embodiment for illustrating the principles of the present disclosure, and is not intended to limit the scope of protection of the present disclosure. Those of ordinary skill in the art can make various changes and improvements without departing from the spirit and essence of this disclosure, which are also within the scope of protection of this disclosure.

The invention claimed is:

1. A liquid feeding pump, comprising:
a pump housing defining a hydraulic chamber, and a water inlet portion and a water outlet portion communicating with the hydraulic chamber, wherein the water inlet portion is configured to allow a first liquid to enter the hydraulic chamber, while the water outlet portion is configured to allow the first liquid to be discharged from the hydraulic chamber;
a pump chamber member at least partially positioned in the hydraulic chamber, and defining a pump chamber isolated from the hydraulic chamber, the pump chamber member being movable between a first configuration in which the pump chamber has a first volume and a second configuration in which the pump chamber has a second volume, the first volume being larger than the second volume;
a liquid inlet portion and a liquid outlet portion which are communicated with the pump chamber, wherein the liquid inlet portion is configured to allow a second liquid to enter the pump chamber, while the liquid outlet portion is configured to allow the second liquid to be discharged from the pump chamber;
wherein the liquid feeding pump is configured such that the first liquid entering the hydraulic chamber through the water inlet portion can urge the pump chamber member towards its second configuration, thereby pumping the second liquid from the pump chamber through the liquid outlet portion,
wherein the liquid feeding pump further comprises a pump head configured to engage the pump housing, and the liquid inlet portion and the liquid outlet portion are located in the pump head,
wherein the pump chamber member is an integral piece made of elastomer material, and comprises a pump chamber member mounting portion fixedly connected to the pump housing and/or the pump head and a pump chamber member body at least partially positioned in the hydraulic chamber and defining the pump chamber which is fluidly isolated from the hydraulic chamber, and
wherein the pump chamber member body comprises a stretchable cylindrical body, and the pump chamber member mounting portion is arranged near the open end of the cylindrical body, and is clamped between the pump head and the pump housing.

2. The liquid feeding pump of claim 1, wherein
the pump chamber member mounting portion comprises upper bosses and/or lower bosses near the radially outer end of the pump chamber member mounting portion, and the upper bosses and/or the lower bosses are configured to fit into a groove of the pump head and/or the pump housing.

3. The liquid feeding pump of claim 1, wherein
the cylindrical body comprises a corrugated portion.

4. The liquid feeding pump of claim 1, wherein
the pump chamber member further comprises an elongated tail extending from a bottom wall of the cylindrical body in an axial direction of the pump chamber, and the elongated tail includes a positioning structure spaced apart from the cylindrical body and configured to be fixed to the pump housing.

5. The liquid feeding pump of claim 1, wherein
the pump chamber member has elasticity for biasing the pump chamber member towards the first configuration.

6. The liquid feeding pump of claim 1, wherein
the pump chamber member comprises a fixed end fixedly arranged relative to the pump housing and a movable end movable relative to the fixed end to move the pump chamber member between the first configuration and the second configuration.

7. The liquid feeding pump of claim 6, wherein
the pump chamber member comprises a bellows, and the interior of the bellows forms the pump chamber.

8. The liquid feeding pump of claim 6, wherein
the liquid feeding pump further comprises a stopping means which is fixedly arranged relative to the fixed end and configured to limit the stroke of the movable end between an extended position corresponding the first configuration of the pump chamber member and a compressed position corresponding to the second configuration of the pump chamber member.

9. The liquid feeding pump of claim 8, wherein
the stopping means comprises a first stopping portion limiting the compressed position of the movable end and a second stopping portion limiting the expanded position of the movable end.

10. The liquid feeding pump of claim 8, wherein
the liquid feeding pump further comprises a pressurizing plug extending from the movable end into the hydraulic chamber, the water inlet portion including a water inlet pipe formed in the pump housing, and the pressurizing plug being arranged to be inserted into the water inlet pipe from a side wall of the water inlet pipe when the movable end is in the expanded position.

11. The liquid feeding pump of claim 1, wherein
the liquid feeding pump further comprises a returning spring connected to the pump chamber member for biasing the pump chamber member body toward the first configuration.

12. The liquid feeding pump of claim 1, wherein
the water inlet portion has a cross-sectional area that is larger than that of the water outlet portion.

13. The liquid feeding pump of claim 1, wherein
the liquid feeding pump further comprises an integral one-way valve, which allows the second liquid to enter the pump chamber through the liquid inlet portion and allows the second liquid to flow out from the pump chamber through the liquid outlet portion.

14. The liquid feeding pump of claim 13, wherein
the feeding pump further includes a one-way valve bracket for supporting the one-way valve, the one-way valve bracket including an inner cylinder, an outer ring and a plurality of webs extending between the inner cylinder and the outer ring, the outer ring being provided with a plurality of bosses which fit into corresponding grooves in the pump head for fixedly connecting the one-way valve to the pump head.

15. A dispensing system, comprising a liquid feeding pump of claim 1 and a liquid storage box communicated with the liquid inlet portion of the liquid feeding pump.

16. A washing device, comprising the dispensing system according to claim 15.

17. The washing device of claim 16, wherein
the washing device is a laundry machine or a dishwasher.

* * * * *